(12) United States Patent
Ringström et al.

(10) Patent No.: US 8,315,344 B2
(45) Date of Patent: Nov. 20, 2012

(54) BLIND DETECTION OF THE TRANSPORT FORMAT (TF) OF A SIGNAL

(75) Inventors: Markus Ringström, Stockholm (SE); Pär Moqvist, Lerum (SE); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 839 days.

(21) Appl. No.: 12/421,059

(22) Filed: Apr. 9, 2009

(65) Prior Publication Data

US 2010/0260231 A1 Oct. 14, 2010

(51) Int. Cl.
*H04B 1/10* (2006.01)
(52) U.S. Cl. ......................................................... 375/350
(58) Field of Classification Search .................. 375/142, 375/143, 144, 147, 148, 149, 150, 152, 316, 375/343, 346, 350; 455/63.1, 114.2, 278.1, 455/296
See application file for complete search history.

(56) References Cited

U.S. PATENT DOCUMENTS

| | | | |
|---|---|---|---|
| 7,050,481 B1 * | 5/2006 | Hulbert | 375/144 |
| 2009/0003301 A1 | 1/2009 | Reial et al. | |
| 2009/0060000 A1 | 3/2009 | Molev-Shteiman et al. | |
| 2009/0207781 A1 * | 8/2009 | Sidi et al. | 370/328 |

FOREIGN PATENT DOCUMENTS

| | | |
|---|---|---|
| EP | 1 855 424 A1 | 11/2007 |
| GB | 2 389 021 A | 11/2003 |
| WO | WO 02/060083 A2 | 8/2002 |
| WO | WO 2006/052423 A2 | 5/2006 |

OTHER PUBLICATIONS

E. Davis, N. Beaulieu, and M. Rollins, "A MAP blind bit-rate detector for variable-gain multiple-access systems", *IEEE Trans. Commun.*, vol. 51, pp. 880-884, Jun. 2003.
E. Cohen and H.-L. Lou, "Multi-rate detection for the IS-95 CDMA forward traffic channels", in *Proc. IEEE GLOBECOM'95*, Nov. 1995, pp. 1789-1793.
M. Juntti, A. Rabbachin, and K. Pajukoski, "Autocorrelation-based blind spreading-factor detection for CDMA", IEEE Trans. Commun., vol. 52, pp. 1453-1458, Sep. 2004.
3GPP. 3rd Generation Partnership Project; Technical Specification Group Radio Access Network; UE Radio Access Capabilities (Release 8). 3GPP TS 25.306 v8.6,0. Mar. 2009.
Kuan, et al. Comparative Study of Adaptive-Rate CDMA Transmission Employing Joint-Decection and Interference Cancellation. Vehicular Technology Conference Proceedings, 2000. IEEE 51st vol. 1. 2000.

* cited by examiner

*Primary Examiner* — Khanh C Tran

(57) ABSTRACT

The transport format (TF) of a signal may be blindly detected from a reduced set of TF hypotheses. In an example embodiment, a method for the blind detection of a TF of a signal includes filtering a set of transport format hypotheses to identify a reduced set of TF hypotheses using one or more filtering schemes. From the reduced set of TF hypotheses, a TF that is associated with an interfering signal is detected. The TF includes a modulation and a spreading factor for the interfering signal. It may also include a number of channelization codes. In an example implementation, when an interfering signal is to be canceled, symbols carried by the signal are detected using the detected TF. Example filtering schemes include filtering based on system design/operation, filtering based on known configuration information, filtering based on an expected level of interference contribution, and so forth.

22 Claims, 10 Drawing Sheets

BLIND DETECTION OF THE TRANSPORT FORMAT (TF) OF A SIGNAL

TECHNICAL FIELD

The present invention relates generally to implementing blind detection of the transport format (TF) of a signal, and more specifically but by way of example only, to blindly detecting the TF of a signal from a reduced set of TF hypotheses.

BACKGROUND

Many specialized terms and abbreviations are used in the communications arts. At least some of the following are referred to within the text that follows, such as in this background and/or the subsequent description sections. Thus, the following terms and abbreviations are herewith defined:
    3GPP 3$^{rd}$ Generation Partnership Project
    4-PAM 4-Pulse Amplitude Modulation
    BPSK Binary Phase Shift Keying
    cat E-DCH physical layer category (e.g., as specified in 3GPP 25.306)
    E-DCH Enhanced Dedicated Channel
    E-DPCCH Enhanced Dedicated Physical Control Channel
    E-DPDCH Enhanced Dedicated Physical Data Channel
    HSPA High-Speed Packet Access
    IC Interference Cancellation
    SF Spreading Factor
    TF Transport Format
    TTI Transmission Time Interval
    WCDMA Wideband Code Division Multiple Access Electronic communication forms the backbone of today's information-oriented society. Electronic communications are transmitted over wireless or wired channels using electromagnetic radiation, such as radio frequency (RF) transmissions, light waves, and so forth. Unfortunately, the availability and capacity of electronic communications are frequently limited by the interference and noise inherent in the communications channel between a transmitting device and a receiving device.

However, the utilization of a communications channel may be increased by adopting any of a number of different schemes. These schemes can enable more information to be communicated in a given spectrum allocation. Efficient utilization of spectrum can reduce the cost of communication services being provided, can enable richer communication services to be provided, or both. Such schemes can also strengthen or otherwise improve signal reception at a receiving device.

An example scheme entails interference cancellation (IC). For example, in future versions of mobile communication systems, IC may be used to achieve better performance in terms of peak data rates, system throughput, system capacity, and so forth. To cancel an interfering signal, the data bits (or at least modulation symbols) that it carries are first detected. The interfering signal is then regenerated at the receiver.

The detection may be performed before decoding (e.g., for pre-decoding IC) or after decoding (e.g., for post-decoding IC). The regeneration is performed to mimic how the transmitted bits arrive at the receiver. This regeneration typically involves going through the operations performed at the transmitter (e.g., reproducing what the transmitter did to the data bits) and channel filtering (e.g., reproducing what the channel has done to the data bits).

Pre-decoding IC therefore entails cancelling an interfering signal before decoding. In this case, the transmitted bits carried in the interfering signal are detected after demodulation, but before decoding. Pre-decoding IC is attractive due to its low latency, which pre-decoding IC offers because there is no need to wait for the receipt of a complete codeword. This low latency advantage is especially pronounced for the case of, for example, a 10 millisecond (ms) Transmission Time Interval (TTI). Typically, for pre-decoding IC the desired latency is on the order of a few slots.

With pre-decoding IC, the interferer is not decoded before the cancellation is performed. Some knowledge of the interferer, however, helps to better detect the interfering signal. For example, if the receiver knows the modulation format used by the transmitter, the transmitted bits may be better detected. Further, a modulated symbol is spread by a channelization (or spreading) code according to a spreading factor (SF). Thus, the receiver uses the SF and the channelization code at the transmitter to recover a modulated symbol.

Herein, the term "transport format" (TF) refers to a combination of the modulation, the SF, and the number of channelization codes that are used by the transmitter. A relevant issue therefore relates to how the TF can be obtained to facilitate the detection of the transmitted bits of an interfering signal.

According to the Enhanced Dedicated Channel (E-DCH) provision of 3GPP release 6, the TF information is carried in a control channel named the Enhanced Dedicated Physical Control Channel (E-DPCCH). Unfortunately, for 10 ms TTI (i.e. 15 WCDMA slots), an E-DPCCH message is also spread over 10 ms. Consequently, the E-DPCCH can only be received very reliably after 10 ms. This means that within the desired latency of pre-decoding IC (e.g., usually within a few or several slots), the TF cannot be detected reliably through the reception of E-DPCCH.

Early E-DPCCH detection is possible provided that E-DPCCH is temporarily boosted in power. However, the E-DPCCH boosting feature is not available for 10 ms TTI. Early E-DPCCH detection is also possible if the E-DPCCH power is steadily increased, but this causes additional interference in the system.

Thus, the current state of the art fails to offer an effective or prudent approach to acquiring the TF in an acceptable timeframe. Consequently, there is a need to address these deficiencies so as to enable pre-decoding IC. Such deficiencies and other needs are addressed by one or more of the various embodiments of the present invention.

SUMMARY

It is an object of the present invention to remedy or at least ameliorate one or more of the deficiencies that are identified herein above. It is an object of certain embodiments of the present invention to reduce the complexity and increase the performance of pre-decoding IC. It is another object of certain embodiments of the present invention to facilitate the blind detection of TFs of interfering signals by considering a reduced set of TF hypotheses.

In an example embodiment, a method is for the blind detection of a TF of a signal. A set of TF hypotheses is filtered using one or more filtering schemes to identify a reduced set of transport format hypotheses. From the reduced set of TF hypotheses, a TF that is associated with an interfering signal is detected. The TF includes a modulation and a spreading factor for the interfering signal. It may also include a number of channelization codes. In an example implementation, when an interfering signal is to be canceled, modulation symbols carried by the signal to be canceled are detected using the detected TF.

In another example embodiment, a receiving device is adapted to perform blind detection of a TF of a signal with one or more processors. A set of TF hypotheses is filtered using one or more filtering schemes to identify a reduced set of transport format hypotheses. From the reduced set of TF hypotheses, a TF that is associated with an interfering signal is detected. The TF includes a modulation and a spreading factor for the interfering signal. It may also include a number of channelization codes. In an example implementation, when an interfering signal is to be canceled, modulation symbols carried by the signal to be canceled are detected using the detected TF.

For example implementations, filtering schemes applied to TF hypotheses include filtering based on system design/operation, filtering based on known configuration information, filtering based on an expected level of interference contribution, and so forth. More specifically, certain SFs and/or modulations may be filtered out if they are unused due to system design, system operation, current terminal category, and so forth. Also, a modulation may be known based on a duration of a communication interval (e.g., a TTI). Furthermore, TF hypotheses having relatively high SFs can be filtered out when they are expected to have a low level of interference contribution. These and other filtering schemes and factors may be used separately or in any combination.

In yet another example embodiment, a method is for implementing pre-decoding IC in a receiving device. A composite signal is received. The composite signal includes one or more interfering signals and at least one desired signal. A TF of an interfering signal is detected from a reduced set of TF hypotheses, which result from application of one or more filtering schemes. If the interfering signal is to be canceled, modulation symbols that are carried by the signal to be canceled are detected using the detected TF. The signal to be canceled is regenerated from the detected modulation symbols. The regenerated signal is canceled from the composite signal to implement pre-decoding IC. The TF detection, symbol detection, signal regeneration, and regenerated signal cancellation may be repeated for each interfering signal. The at least one desired signal is detected from the composite signal after cancellation of the regenerated signal(s).

In yet another example embodiment, a number of channelization codes for an interfering signal may be determined based on a detection threshold. A Rake-combined value for at least one channelization code is obtained. A noise variance is estimated responsive to an unused channelization code. An amplitude of a signal component is estimated responsive to the obtained Rake-combined value and the estimated noise variance. The estimated amplitude of the signal component is compared to the detection threshold. If the estimated amplitude is greater than the detection threshold, it is determined that an additional channelization code has been detected. If the estimated amplitude is less than the detection threshold, it is determined that an additional channelization code has not been detected.

An advantage of certain embodiments of the present invention is that system performance may be increased in terms of, for example, peak data rate, system throughput, system capacity, etc. by implementing IC. Another advantage of certain embodiments of the present invention is that the detection of the TF of interfering signals (which may be canceled) is facilitated by reducing the set of TF hypotheses considered. Yet another advantage of certain embodiments of the present invention is that they may be implemented by a base station (e.g., a Node B) without being dependent on any system level changes or configurations. Additional advantages are noted herein below.

Additional embodiments are also described and/or claimed herein. Example additional embodiments include, by way of example but not limitation, arrangements, memory, systems, and so forth. Additional aspects of the invention are set forth in part in the detailed description, drawings, and claims that follow, and in part may be derived from the detailed description and drawings, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

As described herein above, existing approaches for detecting the TF of an interfering signal are insufficient for pre-decoding IC in at least some situations, such as 10 ms TTI. Another approach for acquiring the TF information is to blindly detect the modulation, the spreading factor, and the number of channelization codes. However, a straightforward implementation of a blind TF detection approach involves a significant complexity cost because the total number of potential TF hypotheses may be very large. The processing requirements, other resource demands, and time consumption can render a brute-force approach untenable.

In contrast, for certain example embodiments as described herein, the complexity of blind TF detection can be decreased. For example, the total possible or universe of TF hypotheses may be reduced using a filtering mechanism. The resulting reduced set of relevant TF hypotheses facilitates blind detection of the modulation, the spreading factor, and the number of channelization codes of the interfering signal.

A number of example filtering schemes are described below. They may be utilized separately or in combination. Three example filtering schemes are described below. First, the number of potential TF hypotheses may be limited through system design and/or system operation. For example, some SFs and/or modulations might be unused due to system settings.

Second, a priori or known information about certain configurations may be taken into account. For example, the modulation of a user with 10 ms TTI may be known. For instance, it is known to be BPSK in a WCDMA system. TF hypotheses with non-BPSK modulations may therefore be filtered out. As another example, some SFs and/or modulations might be unused due to the physical layer category (e.g., the cat) of the terminal.

Third, some TF hypotheses may be discarded due to their expected limited contribution to the total interference of a received signal. For example, a user that is transmitting a signal at a low data rate, which corresponds to a high SF, adds a relatively negligible interference to the total interference plus noise that is affecting the received signal. Such a signal may be an interfering signal, but its cancellation may be omitted while the receiver still achieves an acceptable level of performance. The filtering of TF hypotheses is described further herein below.

Figure 1:
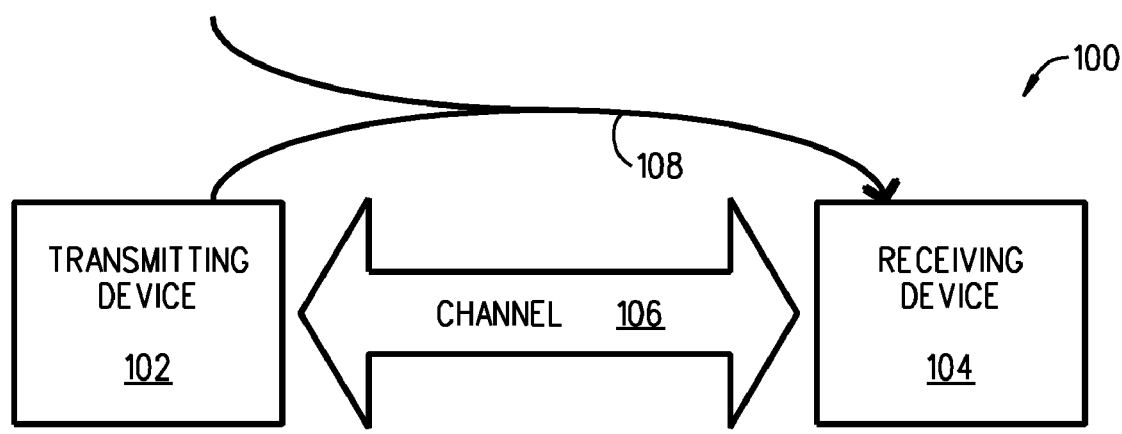
FIG. 1 is a block diagram of an example communications system including a transmitting device, a receiving device, and a composite signal that is communicated between them.

FIG. 1 is a block diagram of an example communications system 100 including a transmitting device 102, a receiving device 104, and a composite signal 108 that is communicated between diem. As illustrated, communications system 100 includes a channel 106 in addition to devices 102/104 and composite signal 108. In operation, transmitting device 102 transmits at least a portion of composite signal 108 over channel 106 to receiving device 104. Receiving device 104 receives composite signal 108, which originated at least partially from transmitting device 102, via channel 106. Composite signal 108 is described further herein below with particular reference to FIG. 2.

It should be understood that a single device may function as a transmitting device 102 at one moment and/or with respect to one communication and as a receiving device 104 at another moment and/or with respect to another communication. Examples of transmitting devices 102 and receiving devices 104 include, by way of example but not limitation, network communication nodes, remote terminals, and other devices that are capable of communicating over a channel 106. Network communication nodes may include, for example, a base transceiver station, a radio base station, a Node B, an access point, and so forth. Remote terminals may include, for example, a mobile terminal, a mobile station, a user equipment, a subscriber station, a communication card or module, and so forth. General example device implementations for transmitting/receiving devices 102/104 are described herein below with particular reference to FIG. 15.

By way of example only, communications system 100 may operate in accordance with a Wideband Code Division Multiple Access (WCDMA) standard. Also, receiving device 104 may be a radio base station (RBS)/Node B, and transmitting devices 102 may be mobile stations/user equipment. However, this is merely one example implementation for a WCDMA-based embodiment. Alternatively, the receiving device may be a remote terminal of any general type, and the transmitting device may be a part of the infrastructure of a general wireless network.

Also, transmitting devices 102 and/or receiving devices 104 may be devices that operate outside of cellular-type wireless networks or even those that operate within a wired network. Moreover, transmitting devices 102 and receiving devices 104 may operate in accordance with a different network standard. Hence, although certain operational principles and numeric values that are used herein refer to an example WCDMA-related implementation, other operational principles and/or numeric values may alternatively be employed.

In operation, channel 106 may be a wired channel or a wireless channel. Regardless, channel 106 affects the transmission, propagation, and/or reception of signals that are transmitted over channel 106. Although only one transmitting device 102 is explicitly shown, multiple transmitting devices 102 may be present and simultaneously transmitting. Each of these transmissions may reach receiving device 104 as signals that are desired to be received. Due to channel effects and/or other transmitting devices that are transmitting "undesired" signals, the signal that reaches receiving device 104 may be a composite signal 108 that includes one or more interfering signal components.

Figure 2:
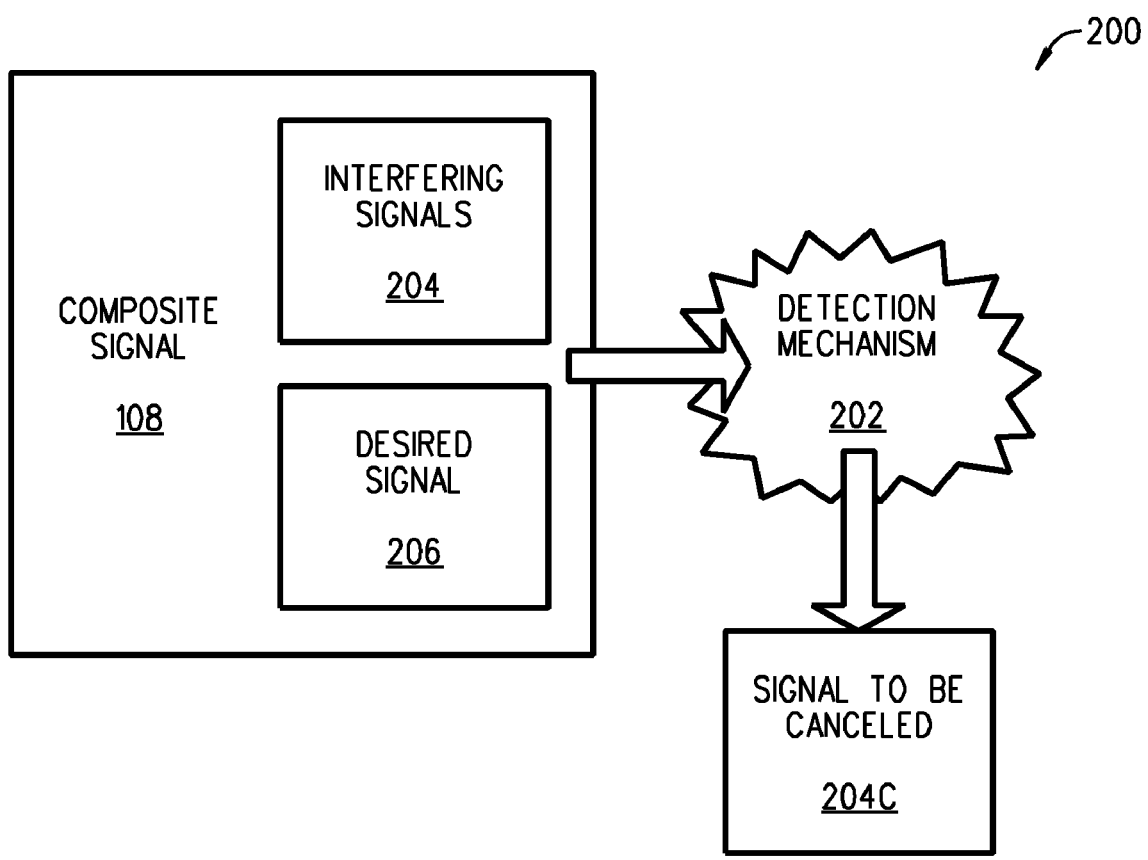
FIG. 2 is a block diagram of an example composite signal which includes an interfering signal that may be detected and categorized as a signal to be canceled through a detection mechanism.

FIG. 2 is a block diagram of an example composite signal 108 which includes an interfering signal 204 that may be detected and categorized as a signal to be canceled 204C through a detection mechanism 202. As illustrated, composite signal 108 includes one desired signal 206 and one or more interfering signals 204. The desired signal 206 originates from a transmitting device 102 (of FIG. 1) with which receiving device 104 wishes to communicate. Interfering signals 204 originate from other transmitting devices 102 with which receiving device 104 does not wish to communicate (at least with respect to a given frequency, timeslot, code, etc.). Interfering signals 204 can also have other originating sources within the environment of communications system 100.

In example embodiments, detection mechanism 202 detects the one or more interfering signals 204 of composite signal 108. Moreover, detection mechanism 202 can detect if an interfering signal 204 is sufficiently interfering so as to warrant cancellation. For example, if an interfering signal 204 meets a predetermined criterion (or criteria), it may be categorized as a signal to be canceled 204C. Examples of such predetermined criteria are described herein below. Detection mechanism 202 is also described further herein below, but in example implementations it involves the detection of the TF of an interfering signal 204.

Figure 3:
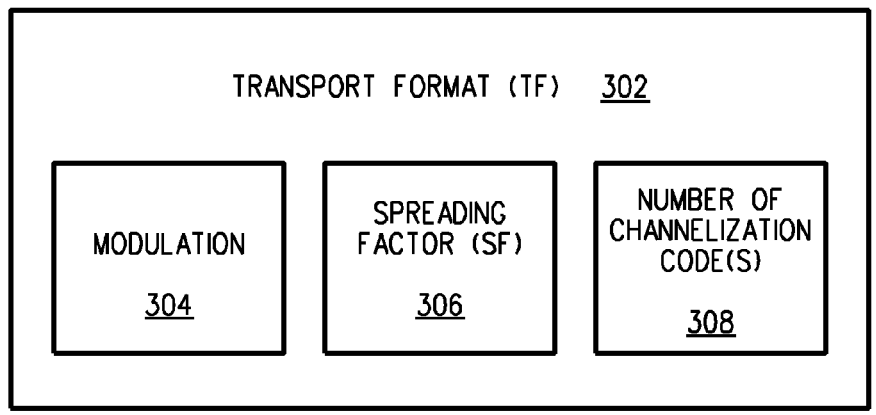
FIG. 3 is a block diagram of an example TF that includes a modulation, a SF, and a number of channelization codes for a transmitted signal.

FIG. 3 is a block diagram of an example TF 302 that includes a modulation 304, a SF 306, and a number of channelization codes 308 for a transmitted signal. Each propagated signal is transmitted in accordance with a TF 302. In other words, both interfering signals 204 and a desired signal 206 (of FIG. 2) are transmitted with a TF 302. The TF 302 is independently selected for each signal 204/206. Specifically, each interfering signal 204 is transmitted with a corresponding TF 302 that is detectable by detection mechanism 202 (of FIG. 2). The corresponding TF 302 may be detected independently for each interfering signal 204.

In an example embodiment, TF 302 includes a modulation 304 at which a signal is transmitted. Because each modulated symbol is spread by a channelization code according to an SF, TF 302 also includes an SF 306 and a number of channelization code(s) 308. In current WCDMA implementations, the number of channelization codes 308 may be one, two or four, but future versions and other standards may provide a different number of available channelization codes.

Figure 4:
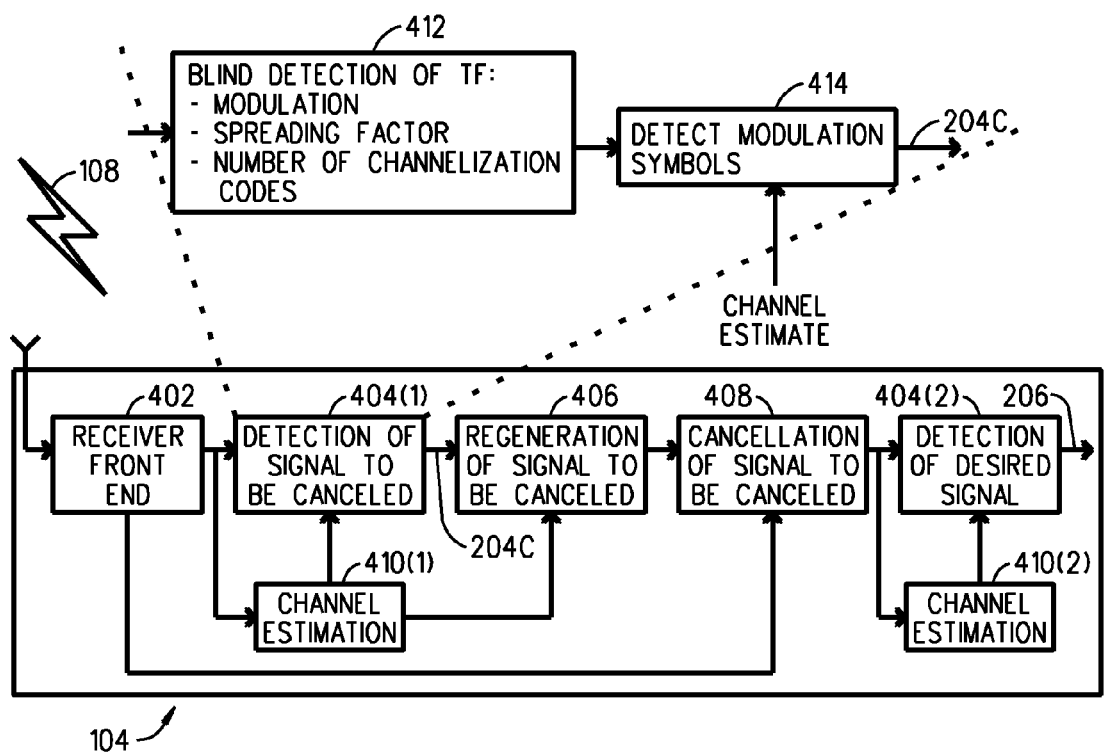
FIG. 4 is a block diagram of an example receiving device that is adapted to detect a signal to be canceled and to perform pre-decoding IC on the signal.

FIG. 4 is a block diagram of an example receiving device 104 that is adapted to detect a signal to be canceled 204C and to perform pre-decoding IC on the signal. As illustrated, receiving device 104 includes a receiver front end 402, a first detection unit 404(1), a regeneration unit 406, a cancellation unit 408, a second detection unit 404(2), a first channel estimation unit 410(1), and a second channel estimation unit 410(2). First detection unit 404(1) includes a blind TF detection unit 412 and a symbol detection unit 414.

In an example embodiment, receiver front end 402 receives a composite signal 108. The signal is forwarded to first detection unit 404(1), first channel estimation unit 410(1), and cancellation unit 408. After estimating the channel, channel estimate parameters are fed from first channel estimation unit 410(1) to first detection unit 404(1), regeneration unit 406, and symbol detection unit 414. First detection unit 404(1) performs the functions of detection mechanism 202. These functions include those of blind TF detection unit 412 and symbol detection unit 414.

Thus, in an example implementation, blind TF detection unit 412 blindly detects a TF 302 of an interfering signal 204 (of FIG. 2) of composite signal 108. First detection unit 404(1) determines whether the detected interfering signal warrants cancellation from composite signal 108 based on at least one predetermined criterion. This predetermined criterion may involve values detected for TF 302. If the interfering signal is categorized as a signal to be canceled 204C, then modulation symbols of the signal to be canceled are detected by symbol detection unit 414. These symbols of the signal to be canceled 204C are forwarded from first detection unit 404(1) to regeneration unit 406. In other words, the signal to be canceled 204C is provided to regeneration unit 406.

Regeneration unit 406 accepts the modulation symbols of the signal to be canceled 204C. From these modulation symbols, regeneration unit 406 regenerates the signal to be canceled. For example, regeneration unit 406 may mimic how the transmitted bits arrive at the receiving device. This regeneration may entail reproducing the operations that were performed at the transmitter (e.g., mimicking what the transmitter did to the modulation symbols) and reproducing the channel filtering (e.g., mimicking what the channel did to the modulation symbols). The regenerated signal to be canceled is forwarded to cancellation unit 408.

Cancellation unit 408 accepts the regenerated signal from regeneration unit 406 and composite signal 108 from receiver front end 402. Cancellation unit 408 cancels the regenerated signal from composite signal 108. The composite signal 108, after the signal to be canceled has been canceled, is forwarded to second detection unit 404(2) and second channel estimation unit 410(2). Multiple ones of interfering signals 204, when present, may be canceled from composite signal 108 by cancellation unit 408.

Channel estimate parameters for the composite signal after the cancellation are fed to second detection unit 404(2) from second channel estimation unit 410(2). Based on the composite signal after cancellation and responsive to the channel estimate parameters, second detection unit 404(2) detects the desired signal 206 (e.g., for the desired user).

Figure 5:
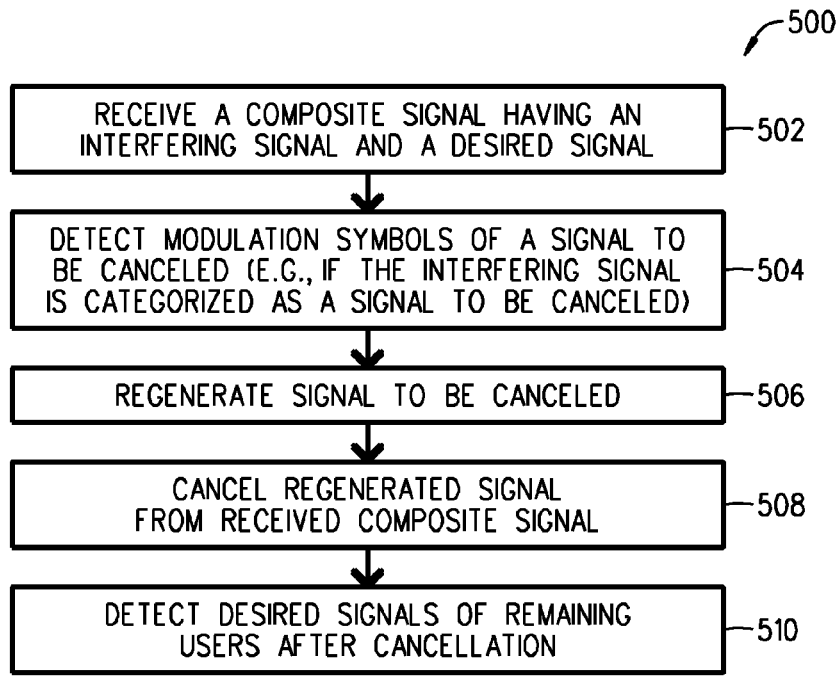
FIG. 5 is a flow diagram of an example method for implementing pre-decoding IC that includes detecting a signal to be canceled.

FIG. 5 is a flow diagram 500 of an example method for implementing pre-decoding IC that includes detecting a signal to be canceled. As illustrated, flow diagram 500 includes five steps 502-510. Flow diagram 500 may be implemented by a communication node or device, such as a receiving device 104 (of FIGS. 1 and 4). The steps of flow diagram 500, as well as those of the other flow diagrams that are described herein, may be effectuated with processor-executable instructions. Processor-executable instructions may be embodied as hardware, firmware, software, fixed logic circuitry, combinations thereof, and so forth. Example operational implementations of processor-executable instructions include, but are not limited to, a memory coupled to a processor, an application-specific integrated circuit (ASIC), a digital signal processor and associated code, some combination thereof, and so forth.

In an example embodiment, flow diagram 500 depicts a method for a receiving device to receive a composite signal and cancel an interfering signal thereof. The acts of steps 502, 504, 506, 508, and 510 may be performed by the receiver front end 402, first detection unit 404(1), regeneration unit 406, cancellation unit 408, and second detection unit 404(2), respectively. Although particular example elements from other FIGS. are referenced to further describe the steps of FIG. 5, the steps may alternatively be performed with other elements.

At step 502, a composite signal having an interfering signal and a desired signal is received. For example, a composite signal 108 having one or more desired signals 206 and at least one interfering signal 204 may be received by a receiver front end 402.

At step 504, modulation symbols of a signal to be canceled are detected. For example, modulation symbols of a signal to be canceled 204C may be detected by first detection unit 404(1). More specifically, blind TF detection unit 412 may detect a TF 302 of an interfering signal 204, and symbol detection unit 414 may detect the symbols of the interfering signal using TF 302. In an example implementation, the method continues for a given interfering signal when it is categorized as a signal to be canceled responsive to a predetermined criterion. This conditional aspect and other example aspects for step 504 are described herein below with particular reference to FIGS. 7 and 8.

At step 506, the signal to be canceled is regenerated. For example, signal to be canceled 204C may be regenerated by regeneration unit 406. At step 508, the regenerated signal is canceled from the received composite signal. For example, the regenerated signal may be canceled from the received composite signal 108 by cancellation unit 408. At step 510, the desired signal(s) of the remaining users are detected after the cancellation. For example, one or more desired signals 206 may be detected by second detection unit 404(2).

Figure 6:
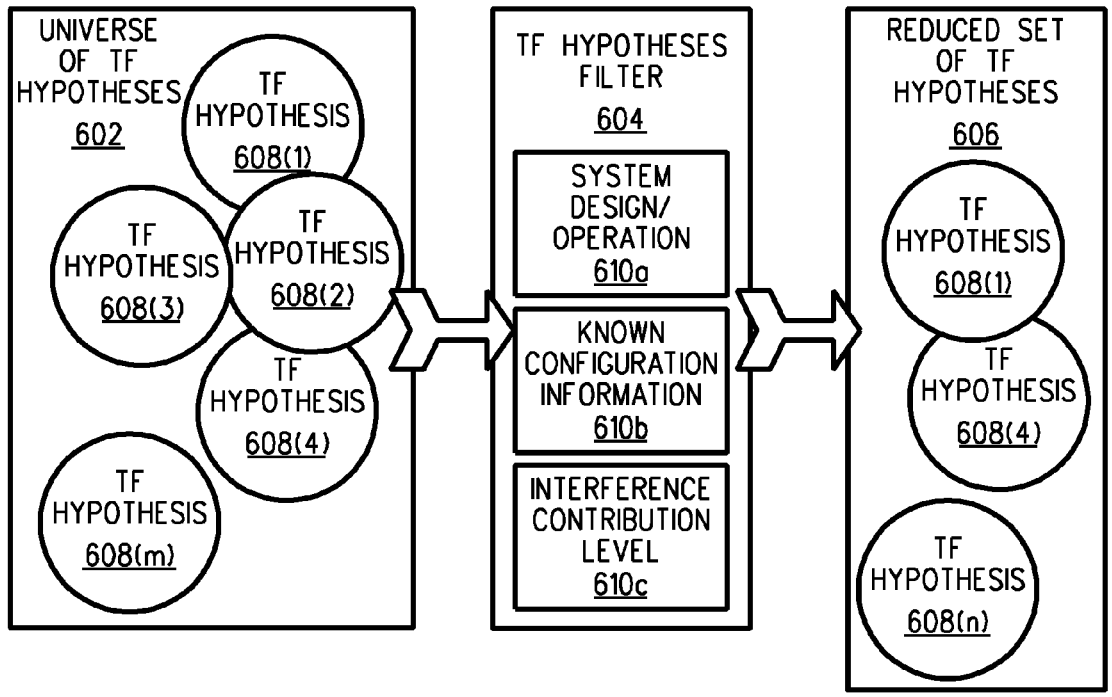
FIG. 6 is a block diagram illustrating an example filtering mechanism in which a TF hypotheses filter is applied to a universe of TF hypotheses to produce a reduced set of TF hypotheses.

FIG. 6 is a block diagram illustrating an example filtering mechanism 600 in which a TF hypotheses filter 604 is applied to a universe of TF hypotheses 602 to produce a reduced set of TF hypotheses 606. As illustrated, universe of TF hypotheses 602 and reduced set of TF hypotheses 606 each include multiple TF hypotheses 608. Specifically, universe of TF hypotheses 602 includes "m" different TF hypotheses 608(1), 608(2), 608(3), 608(4) . . . 608(m), with "m" representing a positive integer. Reduced set of TF hypotheses 606 includes "n" different TF hypotheses 608(1), 608(4) . . . 608(n), with "n" representing a positive integer. Because reduced set of TF hypotheses 606 includes fewer TF hypotheses 608 than does universe of TF hypotheses 602, m>n.

In an example embodiment, each TF hypothesis 608 represents a possible combination of a TF 302. For example, TF hypothesis 608(3) may have a modulation 304 of BPSK, an SF 306 of SF4, and a number of channelization codes 308 of two. The universe of TF hypotheses 602 includes a full set of the possible TF hypotheses 608. In other words, there are "m" total possible TF hypotheses 608. The reduced set of TF hypotheses 606, on the other hand, include fewer than the total possible TF hypotheses 608. This reduced set is created by filtering the universe of TF hypotheses 602 with the TF hypotheses filter 604.

TF hypotheses filter 604 includes multiple filtering schemes 610. Although three filtering schemes 610a, 610b, and 610c are explicitly shown, TF hypotheses filter 604 may include more or fewer of such filtering schemes 610. As illustrated, TF hypotheses filter 604 includes the following filtering schemes 610: a system design/operation filtering scheme 610a, a known configuration information filtering scheme 610b, and an interference contribution level filtering scheme 610c.

Thus, for certain example embodiments, one or more of the filtering schemes 610 of the TF hypotheses filter 604 are applied to the universe of TF hypotheses 602 to produce the reduced set of TF hypotheses 606. All or portions of the TF hypothesis filtering may be performed offline (e.g., prior to operation or receipt of a signal) and/or in real-time during operation. Whichever schemes 610 are employed, they may be applied at different times and in different orders or with full or partial overlap. Example approaches to implementing a TF hypotheses filter 604 are described herein below with particular reference to FIGS. 9-13.

The system design/operation filtering scheme 610a filters out TF hypotheses 608 based on system design and/or system operational parameters. For example, some SFs and/or modulations might be unused due to system settings. Such SFs or modulations may therefore be filtered out before SF detection. For instance, the modulation of a user with 10 ms TTI may be known. In a WCDMA system, it is known to be BPSK. Consequently, TF hypotheses 608 with non-BPSK modulations may be filtered out.

The known configuration information filtering scheme 610b filters out TF hypotheses 608 based on a priori or known information about certain configurations. For example, some SFs and/or modulations might be unused due to terminal category or cat. When the physical layer category is known, TF hypotheses 608 that have SFs and/or modulations that do not match the known terminal cat may be filtered by excluding them from the reduced set of TF hypotheses 606. As another example, a maximum E-DCH transmission rate may be signaled. This forces the terminal to use a minimum SF and/or a maximum number of channelization codes. Hence, SFs and/or numbers of channelization codes that are outside of these boundaries may be filtered out.

The interference contribution level filtering scheme 610c filters out TF hypotheses 608 if their expected contribution to the total interference is relatively low. For example, a user that is transmitting a signal at a relatively low data rate, which corresponds to a relatively high SF, adds a relatively negligible interference to the total interference plus noise that is affecting a received signal. Such a high-SF signal may be an interfering signal, but its cancellation may be omitted while still enabling the receiver to achieve an acceptable level of performance for decoding desired components of a received signal. When this filtering scheme is implemented, some SF hypotheses are discarded. For example, in WCDMA, a signal may be spread with SF2, SF4, SF8, SF16, SF32, SF64, SF128, or SF256. The benefit of cancelling out an interfering signal with SF16 or higher might be small. In this case, a receiver may implement filtering scheme 610c to filter out SF32, SF64, SF128, and SF256 during the blind TF detection process. As a result, only TF hypotheses that include SF2, SF4, SF8, or SF16 may be kept in the reduced set of TF hypotheses 606. An interfering signal using one of these higher SF's will most likely be detected as using SF16, and it will thus not be categorized as a signal to be canceled. Hence, a predefined SF value can be a predetermined criterion that is used to filter out SF hypotheses and to determine whether an interfering signal is to be categorized as a signal to be canceled.

Figure 7:
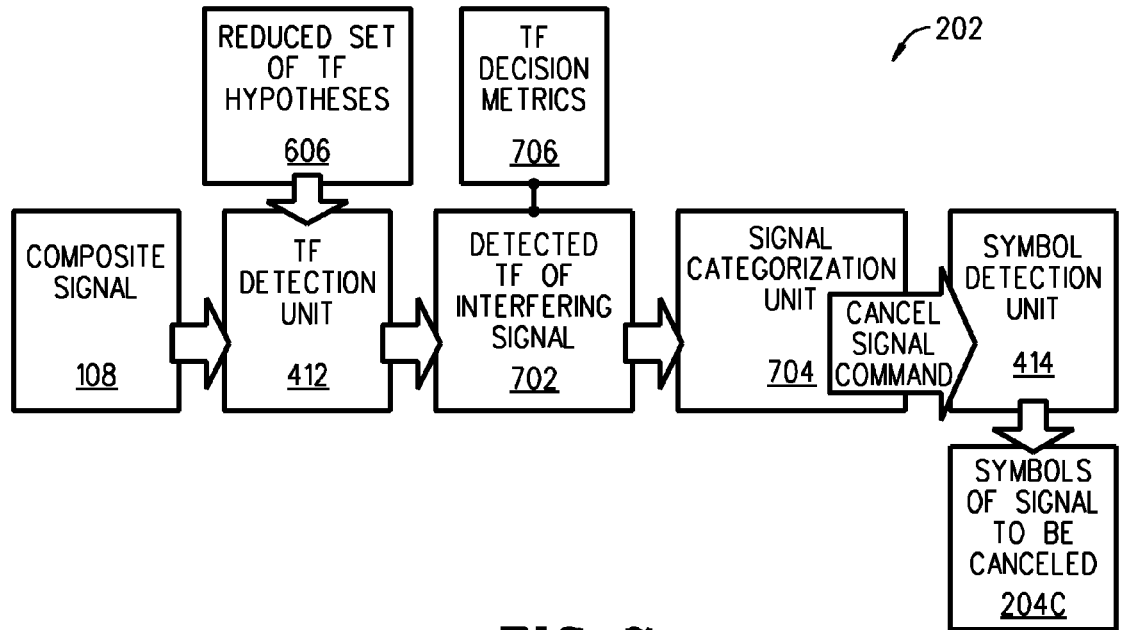
FIG. 7 depicts an example detection mechanism involving a TF detection unit and a symbol detection unit to extract modulation symbols of a signal to be canceled from a composite signal using a reduced set of TF hypotheses.

FIG. 7 depicts an example detection mechanism 202 involving a TF detection unit 412 and a symbol detection unit 414 to extract modulation symbols of a signal to be canceled 204C from a composite signal 108 using a reduced set of TF hypotheses 606. As illustrated, example detection mechanism 202 includes TF detection unit 412, the detected TF of an interfering signal 702, a signal categorization unit 704, symbol detection unit 414, and TF decision metrics 706. Detection mechanism 202 also involves composite signal 108, the signal to be canceled 204C, and a reduced set of TF hypotheses 606.

In an example embodiment, composite signal 108 and the reduced set of TF hypotheses 606 are input to TF detection unit 412. By using the reduced set of TF hypotheses 606 to facilitate the TF detection analysis, TF detection unit 412 produces the detected TF of the interfering signal 702. More specifically, TF detection unit 412 produces a set of TF decision metrics 706. From the set of TF decision metrics 706, TF detection unit 412 determines the detected TF of the interfering signal 702.

Based on the detected TF of the interfering signal 702, signal categorization unit 704 categorizes the signal. The interfering signal may be categorized as being a signal to be canceled or merely an interfering signal that is not to be canceled (e.g., that can be ignored with respect to IC purposes). This categorization may also be effectuated as part of the filtering of the TF hypotheses 608. If it is determined that the interfering signal should be canceled, then a command to cancel the signal is provided from signal categorization unit 704 to symbol detection unit 414. Symbol detection unit 414 uses the detected TF of the interfering signal 702 to detect the modulation symbols of the signal to be canceled 204C.

Figure 8:
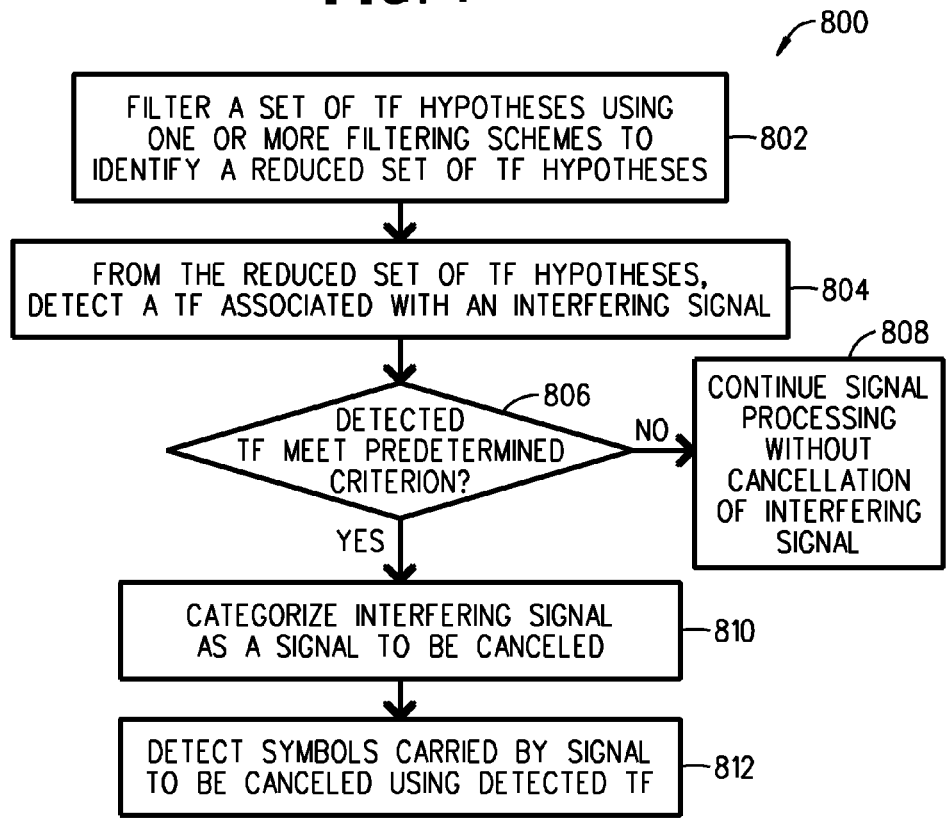
FIG. 8 is a flow diagram of an example method for detecting modulation symbols carried by a signal to be canceled using a reduced set of TF hypotheses.

FIG. 8 is a flow diagram 800 of an example method for detecting modulation symbols carried by a signal to be canceled using a reduced set of TF hypotheses. Flow diagram 800 includes six steps 802-812. For an example embodiment, the acts of flow diagram 800 may be performed by first detection unit 404(1) (of FIG. 4). More specifically, the acts of step 804 may be performed by TF detection unit 412 (of FIGS. 4 and 7). The acts of steps 806 and 810 may be performed by signal categorization unit 704. The acts of step 812 may be performed by symbol detection unit 414. Although particular example elements from other FIGS. are referenced to describe the steps of FIG. 8, the steps may alternatively be performed with other elements.

At step 802, a set of TF hypotheses is filtered using one or more filtering schemes to identify a reduced set of TF hypotheses. For example, a reduced set of TF hypotheses 606 may be retrieved from memory (e.g., if the reduced set was fully or partially prepared previously) or a reduced set of TF hypotheses 606 may be created by applying a TF hypotheses filter 604 to a universe of TF hypotheses 602 (or a previously partially reduced set of TF hypotheses 606). Thus, one or more filter schemes 610a, 610b, and/or 610c may be applied as part of step 802.

At step 804, from the reduced set of TF hypotheses, a TF that is associated with an interfering signal is detected. For example, from the reduced set of TF hypotheses 606, the TF that is associated with an interfering signal 702 (from a TF hypothesis 608) may be blindly detected by TF detection unit 412.

At step 806, it is determined if the detected TF meets at least one predetermined criterion. For example, it may be determined by signal categorization unit 704 if an SF 306 of the detected TF of the interfering signal 702 is less than a predefined SF threshold. Example values for such a predefined SF threshold are described herein below. If the detected TF does not meet the predetermined criterion, then at step 808 signal processing is continued without cancellation of the interfering signal.

If, on the other hand, the detected TF does meet the predetermined criterion (as determined at step 806), then at step 810 the interfering signal is categorized as a signal to be canceled. For example, an interfering signal 204 may be categorized by signal categorization unit 704 as a signal to be canceled 204C. The acts of steps 806 and 810 may also be performed as part of step 802 (e.g., by applying an interference contribution level filtering scheme 610c). At step 812, modulation symbols that are carried by the signal to be canceled are detected using the TF that was detected from the reduced set of TF hypotheses. For example, modulation symbols of the signal to be canceled 204C may be detected by symbol detection unit 414 by detecting the modulation symbols in accordance with the detected TF 702.

Additional example embodiments for filtering TF hypotheses are described below. Numerical values and operational parameters pertain to an example WCDMA implementation. For example, with a WCDMA uplink, the transmitted bits are modulated using BPSK or 4-PAM modulation. However, the principles are applicable to other values, parameters, and communication standards.

In an example implementation, a system side may limit the number of possible SFs and/or modulation format alternatives through signaling. For a 10 ms TTI terminal, the possible spreading factor and channelization code combinations are SF256, SF128, SF64, SF32, SF16, SF8, SF4, 2*SF4 (i.e., use 2 channelization codes with a spreading factor of 4), and 2*SF2. Furthermore, the modulation is known to be BPSK, and thus active blind detection of the modulation may be omitted through filtering the other possible modulation formats.

With respect to spreading factors, the system side can, for example, forbid the terminal to transmit at certain spreading factor combinations, e.g. 2*SF2 in the case of a 10 ms TTI terminal. The lowest possible spreading factor is then 4. Also, the benefit of cancelling a signal with a spreading factor larger than a predefined SF level (e.g., eight for this example) may be small in certain situations. Thus, a receiver may omit differentiating whether the SF is 16, 32, 64, 128, or 256. Consequently, all of these "higher" SFs can be detected as "16 or higher". According to this example, the receiver can therefore detect whether the SF is 4, 8, or "16 or higher".

If an SF is detected as 4, the receiver then detects whether multiple channelization codes are used. Afterwards, the signal of interest can be Rake processed (e.g., despread and combined), and the Rake receiver outputs can be demodulated, which gives rise to estimates of the transmitted bits. The estimated bits can then be used in signal regeneration, and the regenerated signal may be cancelled from the received signal.

If an SF is detected as 8, the receiver can omit detection of whether multiple channelization codes are used because multicode transmission is not allowed at a SF of 8 in this example. The signal of interest can be Rake processed (e.g., despread and combined), and the Rake receiver outputs can be demodulated, which gives rise to estimates of the transmitted bits. The estimated bits can then be used in signal regeneration, and the regenerated signal may be cancelled from the received signal.

If an SF is detected as 16 or higher, the receiver can omit processing this signal any further with regard to IC. Such a signal is then processed after the entire TTI (10 ms) is received, and it will not be cancelled from the received signal. This situation and its values are presented by way of example only. They demonstrate how the knowledge of system operation configuration, TTI length, etc. can be used through filtering to eliminate certain TF hypotheses to reduce the complexity of the blind TF detection.

For an example WCDMA release, the following channelization codes and SF configurations are permitted for 2 and 10 ms TTI. For 10 ms TTI, the following three configurations are possible:
1) E-DPDCH1 uses SF>=4;
2) E-DPDCH1 uses SF4 and E-DPDCH2 uses SF4; and
3) E-DPDCH1 uses SF2 and E-DPDCH2 uses SF2.

Of these three configurations, configurations 2 and 3 use multiple channelization codes (E-DPDCH's).

For 2 ms TTI, the following four configurations are possible:
1) E-DPDCH1 uses SF>=4;
2) E-DPDCH1 uses SF4 and E-DPDCH2 uses SF4;
3) E-DPDCH1 uses SF2 and E-DPDCH2 uses SF2; and
4) E-DPDCH1 uses SF2, E-DPDCH2 uses SF2, E-DPDCH3 uses SF4, and E-DPDCH4 uses SF4.

Of these four configurations, configurations 2, 3, and 4 use multiple channelization codes (E-DPDCH's).

FIGS. 9-13 are block diagrams illustrating example TF hypotheses filters for systems operating under different parameters and constraints. The detection/determination of different parts of a TF is illustrated in these FIGS. However, the order in which the modulation, the SF, and/or the number of channelization codes are detected may differ from the order that is depicted in the block diagrams. For each diagram at each phase, one or more hypotheses are filtered out for a given interfering signal. The filtering process may be applied for each such interfering signal.

Figure 9:
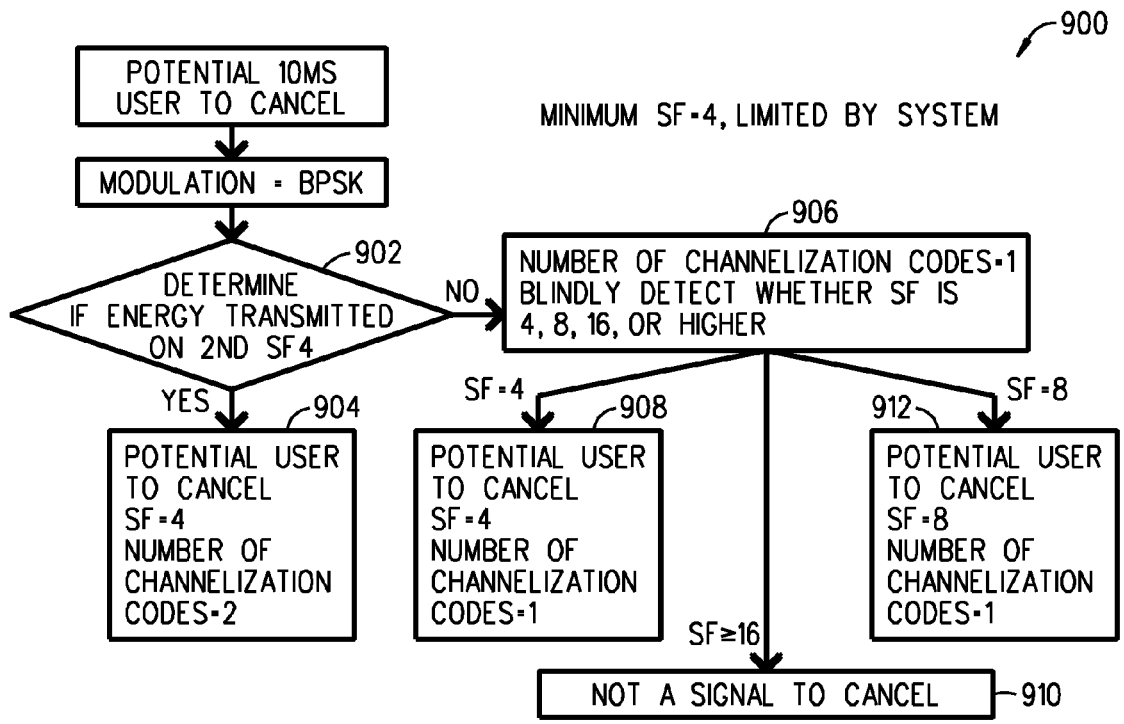
FIG. 9 is a block diagram illustrating an example TF hypotheses filter for a system in which the minimum SF is 4.

FIG. 9 is a block diagram illustrating an example TF hypotheses filter 900 for a system in which the minimum SF is 4, as limited by the system, which allows TF hypotheses with SF2 to be filtered out. In this case, there is a potential 10 ms user to cancel. It is known that the modulation is BPSK. Hence, TF hypotheses having 4-PAM modulation can be filtered out. In an example filtering implementation, at block 902 it is determined if energy is transmitted on the second channelization code of SF=4 for a given interfering signal. If yes, then at block 904 it is determined that this is a potential user to cancel with SF=4 and the number of channelization codes=2. If no, then at block 906 it is determined that the number of channelization codes=1, and the SF is to be blindly detected as being 4, 8, or "16 or higher".

If the SF is detected to equal 4, then at block 908 it is determined that this is a potential user to cancel with SF=4 (and one channelization code). If the SF is detected to equal 8, then at block 912 it is determined that this is a potential user to cancel with SF=8 (and one channelization code). If the SF is detected as being 16 or greater, then at block 910 it is determined that this is not a signal to be canceled.

Figure 10:
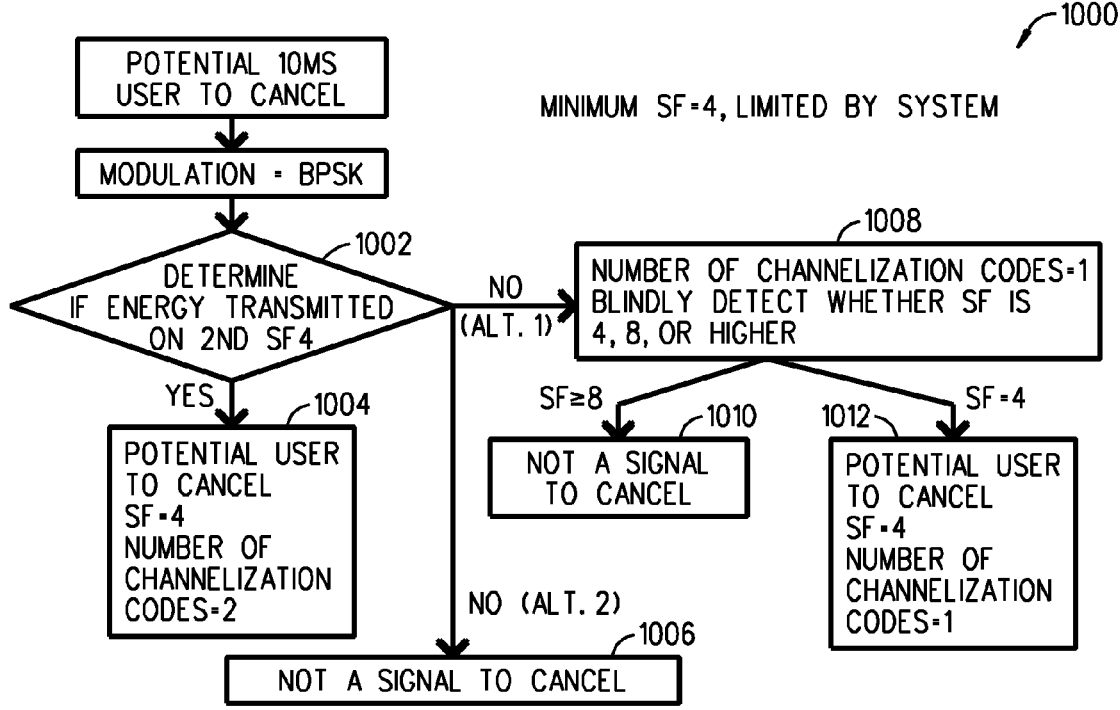
FIG. 10 is a block diagram illustrating an alternative example TF hypotheses filter for a system in which the minimum SF is 4.

FIG. 10 is a block diagram illustrating an alternative example TF hypotheses filter 1000 for a system in which the minimum SF is 4, as limited by the system, which allows TF hypotheses with SF2 to be filtered out. In this case, there is a potential 10 ms user to cancel. It is known that the modulation is BPSK. Hence, TF hypotheses having 4-PAM modulation can be filtered out. In an example filtering implementation, at block 1002 it is determined if energy is transmitted on the second channelization code of SF=4. If yes, then at block 1004 it is determined that this signal is a potential user to cancel with SF=4 and the number of channelization codes=2. With alternative 1, a system is to cancel any multi-code signal plus any single-code signal with SF4. With alternative 2, the system focuses on canceling multi-code signals. If no, under alternative 2, it is determined at block 1006 that this is not a potential user signal to cancel. This alternative 2 reflects a case in which the predetermined criterion to determine whether an interfering signal is to be categorized as a signal to be canceled is set to SF=2*SF4.

Furthermore, under alternative 1 when there is no energy on the second SF=4 (as determined at block 1002), it is determined at block 1008 that the number of channelization codes=1, and the SF is to be blindly detected as being 4 or "8 or higher". If the SF is detected to equal 4, then at block 1012 it is determined that this is a potential user signal to cancel with SF=4 (and one channelization code). If the SF is detected as being 8 or greater, then at block 1010 it is determined that this is not a potential user signal to be canceled.

Figure 11:
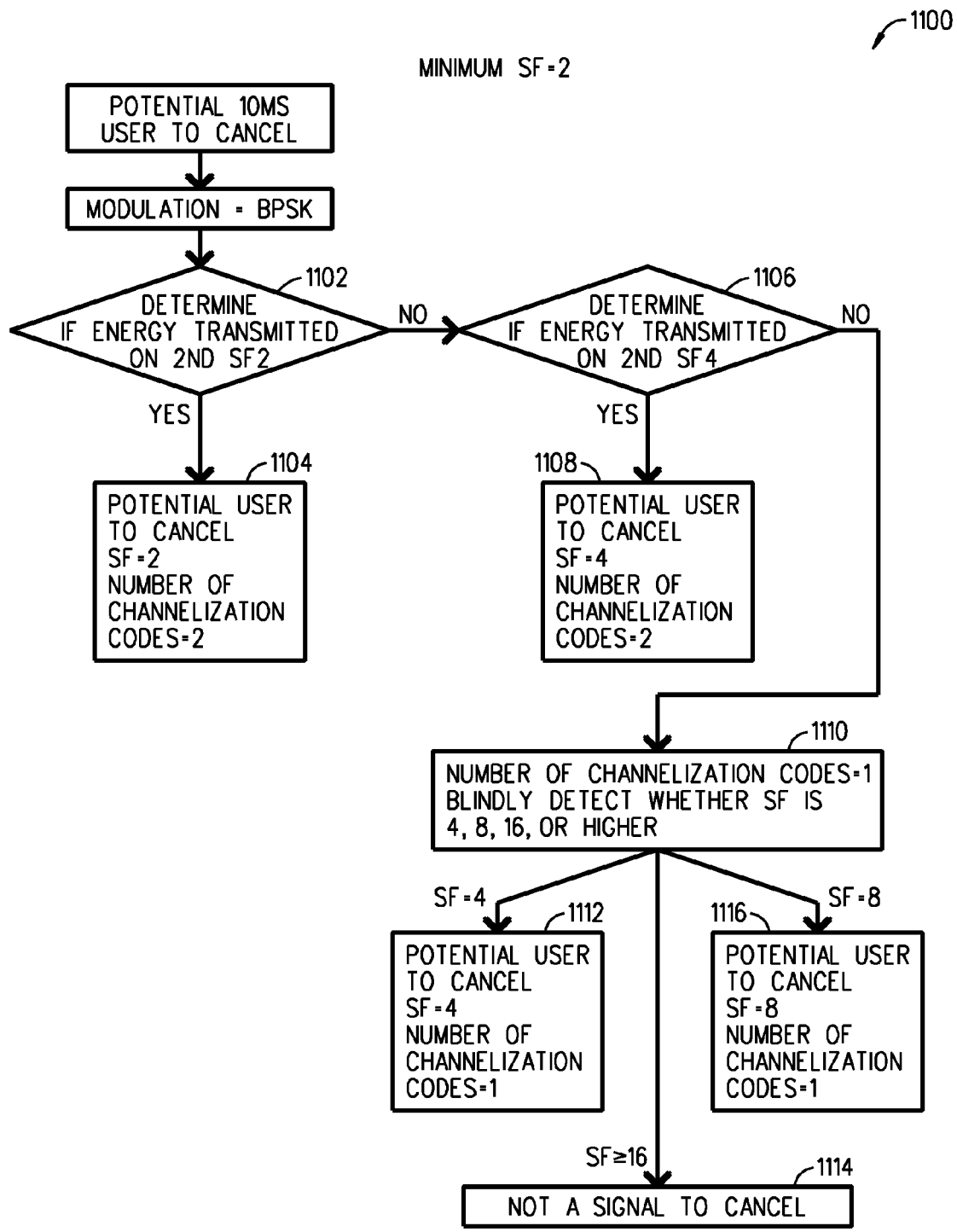
FIG. 11 is a block diagram illustrating an example TF hypotheses filter for a system in which the minimum SF is 2.

FIG. 11 is a block diagram illustrating an example TF hypotheses filter 1100 for a system in which the minimum SF is 2. In this case, there is a potential 10 ms user to cancel. It is known that the modulation is BPSK. Hence, TF hypotheses having 4-PAM modulation can be filtered out. As compared to the TF hypotheses filter 900 (of FIG. 9), there are extra TF hypotheses to consider because SF=2 is not automatically filtered out by system settings.

In an example filtering implementation, at block 1102 it is determined if energy is transmitted on the second channelization code of SF=2. If yes, then at block 1104 it is determined that this signal is a potential user to cancel with SF=2 and the number of channelization codes=2. If no, then at block 1106 it is determined if energy is transmitted on the second channelization code of SF=4. If yes, then at block 1108 it is determined that this is a potential user to cancel with SF=4 and the number of channelization codes=2. If no, then at block 1110 it is determined that the number of channelization codes=1, and the SF is to be blindly detected as being 4, 8, or "16 or higher".

If the SF is detected to equal 4, then at block 1112 it is determined that this is a potential user to cancel with SF=4 (and one channelization code). If the SF is detected to equal 8, then at block 1116 it is determined that this is a potential user to cancel with SF=8 (and one channelization code). If the SF is detected as being 16 or greater, then at block 1114 it is determined that this is not a potential user signal to be canceled.

Figure 12:
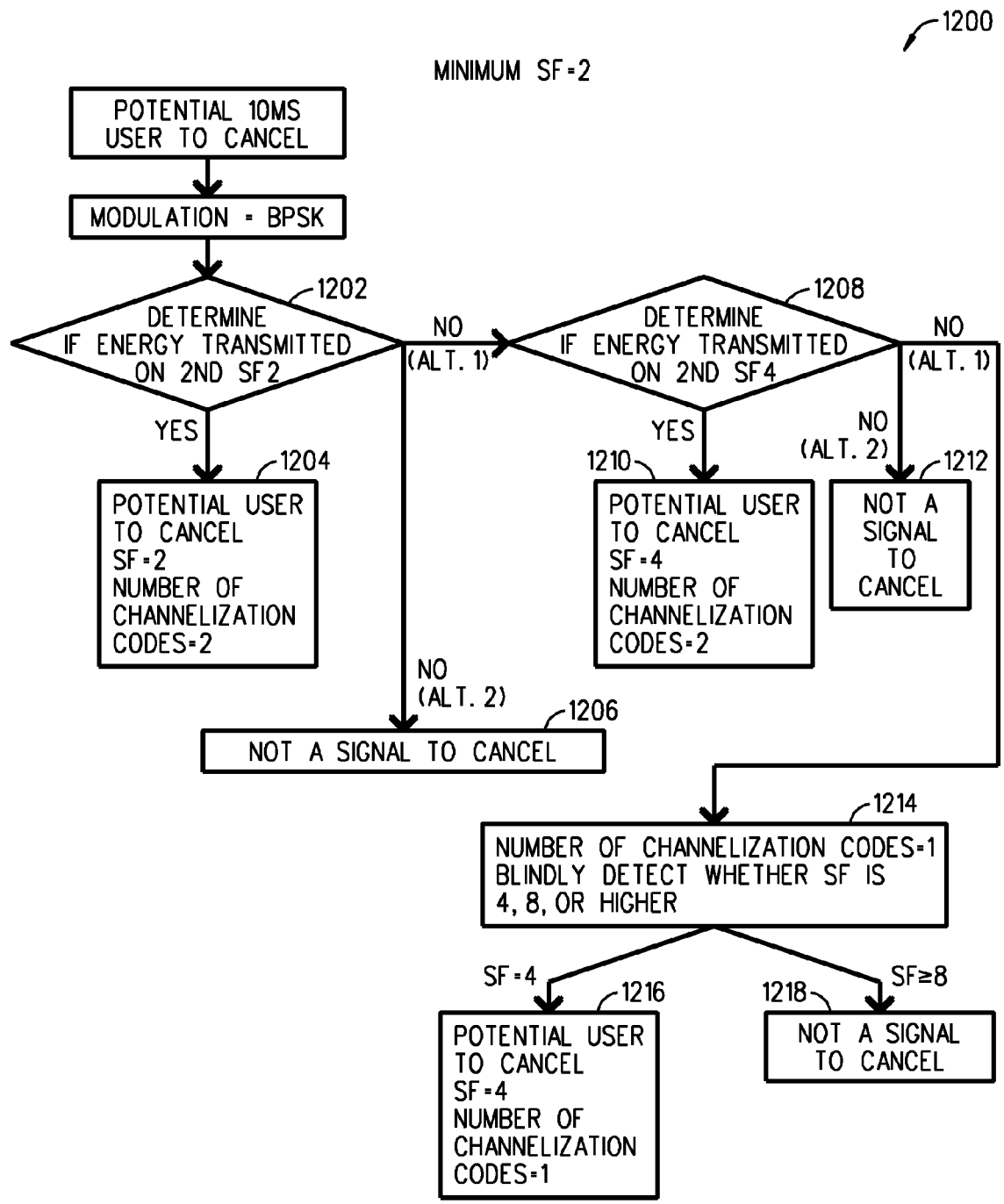
FIG. 12 is a block diagram illustrating an alternative example TF hypotheses filter for a system in which the minimum SF is 2.

FIG. 12 is a block diagram illustrating an alternative example TF hypotheses filter 1200 for a system in which the minimum SF is 2. In this case, there is a potential 10 ms user to cancel. It is known that the modulation is BPSK. Hence, TF hypotheses having 4-PAM modulation can be filtered out. As compared to the TF hypotheses filter 1000 (of FIG. 10), there are extra TF hypotheses to consider because SF=2 is not automatically filtered out by system settings.

In an example filtering implementation, at block 1202 it is determined if energy is transmitted on the second channelization code of SF=2. If yes, then at block 1204 it is determined that this signal is a potential user to cancel with SF=2 and the number of channelization codes=2. If no, under alternative 2, it is determined at block 1206 that this is not a potential user signal to cancel. This alternative 2 reflects a case in which the predetermined criterion to determine whether an interfering signal is to be categorized as a signal to be canceled is set to SF=2*SF2. Furthermore, under alternative 1 when there is no energy on the second SF=2 (as determined at block 1202), it is determined at block 1208 if energy is transmitted on the second channelization code of SF=4. If yes, then at block 1210 it is determined that this is a potential user to cancel with SF=4 and the number of channelization codes=2. If no, under alternative 2, it is determined at block 1212 that this is not a potential user signal to cancel. This alternative 2 reflects a case in which the predetermined criterion to determine whether an interfering signal is to be categorized as a signal to be canceled is set to two channelization codes of SF≦4.

Furthermore, under alternative 1 when there is no energy on the second SF=4 (as determined at block 1208), it is determined at block 1214 that the number of channelization codes=1, and the SF is to be blindly detected as being 4 or "8 or higher". If the SF is detected to equal 4, then at block 1216 it is determined that this is a potential user signal to cancel with SF=4 (and one channelization code). If the SF is detected as being 8 or greater, then at block 1218 it is determined that this is not a potential user signal to be canceled.

Figure 13:
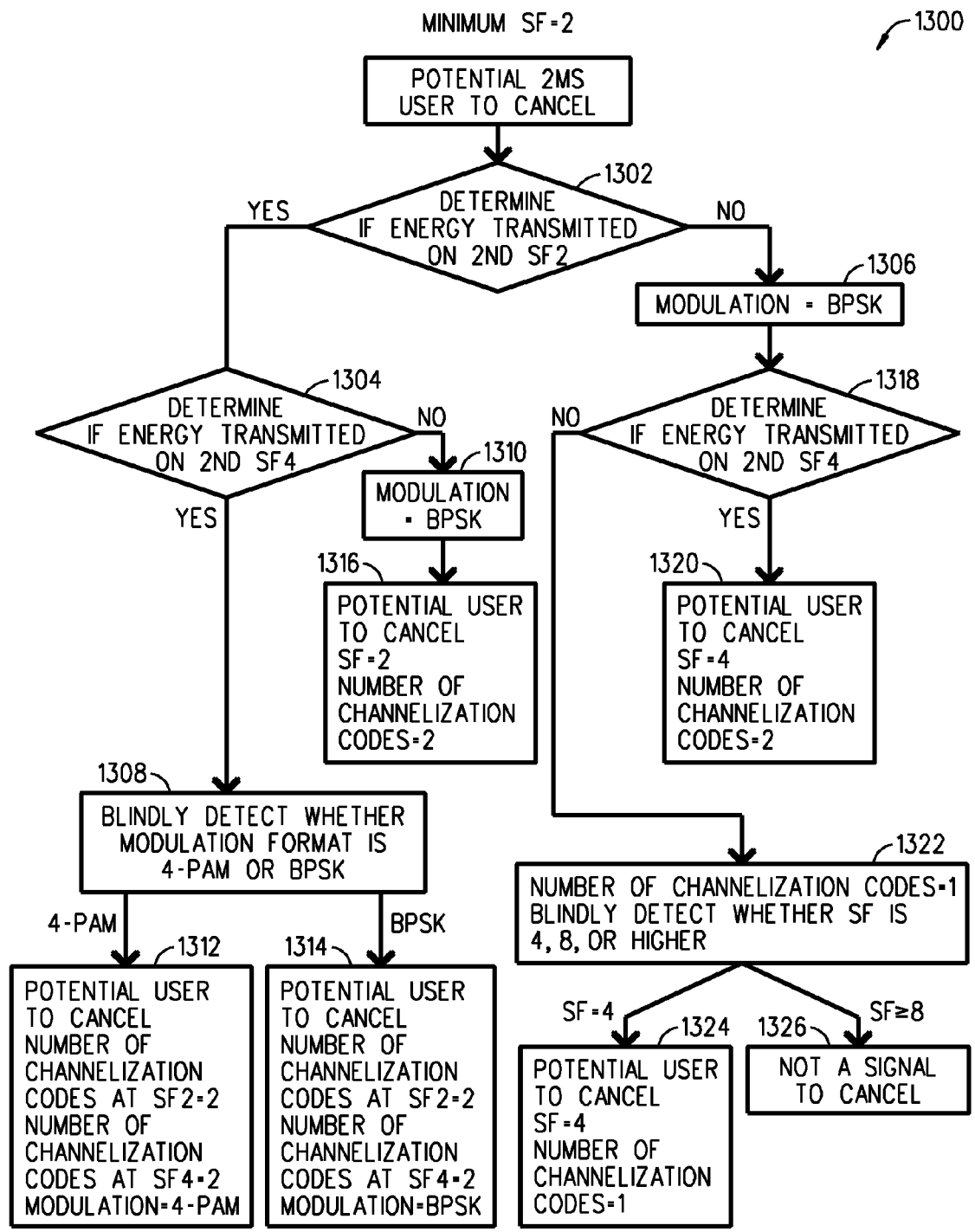
FIG. 13 is a block diagram illustrating an example TF hypotheses filter for a system in which the minimum SF is 2.

FIG. 13 is a block diagram illustrating an example TF hypotheses filter 1300 for a system in which the minimum SF is 2. In this case, however, an interfering signal with 2 ms TTI is under consideration. Consequently, the modulation is unknown. At block 1302, it is determined if energy is transmitted on the second channelization code of SF=2. If yes, then at block 1304 it is determined if energy is transmitted on the second channelization code of SF=4. If yes, then at block 1308 it is blindly detected whether the modulation format is 4-PAM or BPSK. If it is detected to be 4-PAM, then it is determined at block 1312 that this signal is a potential user to cancel with a modulation format of 4-PAM having a number of channelization codes=2 at SF=2 and SF=4. If the modulation format is detected to be BPSK, then it is determined at block 1314 that this is a potential user to cancel with a modulation format of BPSK having a number of channelization codes=2 at both SF=2 and SF=4.

On the other hand, if no energy is transmitted on the second channelization code of SF=4 (as determined at block 1304), then it is determined at block 1310 that the modulation is BPSK and at block 1316 that this is a potential user to cancel with a number of channelization codes=2 and with an SF=2. Additionally, if it is determined (at block 1302) that there is no energy transmitted on the second channelization code of SF=2, then at block 1306 it is determined that the modulation is BPSK.

It is also determined at block 1318 if energy is transmitted on the second channelization code of SF=4. If yes, then at block 1320 it is determined that this is a potential user to cancel with SF=4 and the number of channelization codes=2. If no, then it is determined at block 1322 that the number of channelization codes=1, and the SF is to be blindly detected as being 4 or "8 or higher". If the SF is detected to equal 4, then at block 1324 it is determined that this is a potential user signal to cancel with SF=4 (and one channelization code). If the SF is detected as being 8 or greater, then at block 1326 it is determined that this is not a potential user signal to be canceled.

In another example embodiment, knowledge of the terminal E-DCH physical layer category (abbreviated "cat" in the scheme below) may be used as part of a TF hypothesis filtering mechanism. For instance, the TF detection of a 10 ms TTI user to potentially cancel may be facilitated with the following example scheme:

```
Modulation = BPSK
IF cat == 1
    Minimum SF = 4
    Max number of spreading codes = 1
ELSE IF cat == 2
    Minimum SF = 4
    Max number of spreading codes = 2
ELSE IF cat == 3
    Minimum SF = 4
    Max number of spreading codes = 2.
```

This scheme may be used individually or in combination with the filtering schemes described above, including those illustrated in FIGS. 9-13, to bypass or shortcut some detection analysis steps.

In other example embodiments (e.g., for WCDMA), the system side may limit the E-DCH transmission rate using a scheduling grant which is signaled to the terminal. The maximum transmission rate implies another set of restrictions on the number of spreading codes and the SF in certain standards. For WCDMA, these sets of restrictions are enumerated in 3GPP TS 25.321, "MAC protocol specification," v7.10.0 and in 3GPP TS 25.212, "Multiplexing and channel coding (FDD)," v7.9.0. These restrictions may override those given by the E-DCH physical layer category described above. They can also change during a communication session if a new scheduling grant is signaled by the system. Because blind TF detection may be performed for each TTI, the system may employ the current set of restrictions at any time in order to further improve detection performance.

As described above, especially with reference to FIG. 3, a TF includes a modulation 304, an SF 306, and a number of channelization codes 308. Although TF hypothesis filtering can reduce the number of TF hypotheses that are to be considered, the SF still has to be detected in some situations. In other words, whether the SF is 4, 8, 8 or higher, 16, 16 or higher, etc. may be detected as part of the overall TF detection mechanism. The number of channelization codes 308 may also be detected as part of the overall TF detection mechanism. Detecting SFs is addressed immediately below. Detecting channelization code number is addressed further below with particular reference to FIG. 14.

The SF detection may be implemented using, for example, an existing approach. Generally, conventional SF detection algorithms involve calculating an SF decision metric associated with each SF hypothesis. For example, an autocorrelation-based SF detector has been proposed by M. Juntti, A. Rabbachin, and K. Pajukoski (in "Autocorrelation-based blind spreading-factor detection for CDMA", IEEE Trans. Commun., vol 52, pp. 1453-1458, September 2004). According to this proposal, if the lowest possible SF is 4, the receiver first Rake processes the received signal using SF2 (i.e., processes the signal at one-half of the lowest possible SF). This produces partially despread and combined values $y_2(k)$ Partially despread and combined values at other SFs can be obtained with the following two equations (e.g., for SF4 and SF8, respectively):

$$y_4(k) = \frac{1}{\sqrt{2}} \sum_{i=0}^{1} y_2(2k+i)$$

$$y_8(k) = \frac{1}{\sqrt{4}} \sum_{i=0}^{3} y_2(4k+i).$$

The decision metric for SF L can be computed by the following equation for C(L):

$$C(L)=E[y_{L/2}(2k)y_{L/2}(2k+1)]$$

The detected SF is the L that maximizes the above decision metric among all SF hypotheses (e.g., from the reduced set of TF hypotheses 606). Regardless of what SF detection approach is used, by reducing the number of SF hypotheses through filtering, the number of decision metrics to be computed can be similarly reduced. Reducing the number of decision metrics can likewise reduce the detector complexity.

Figure 14:
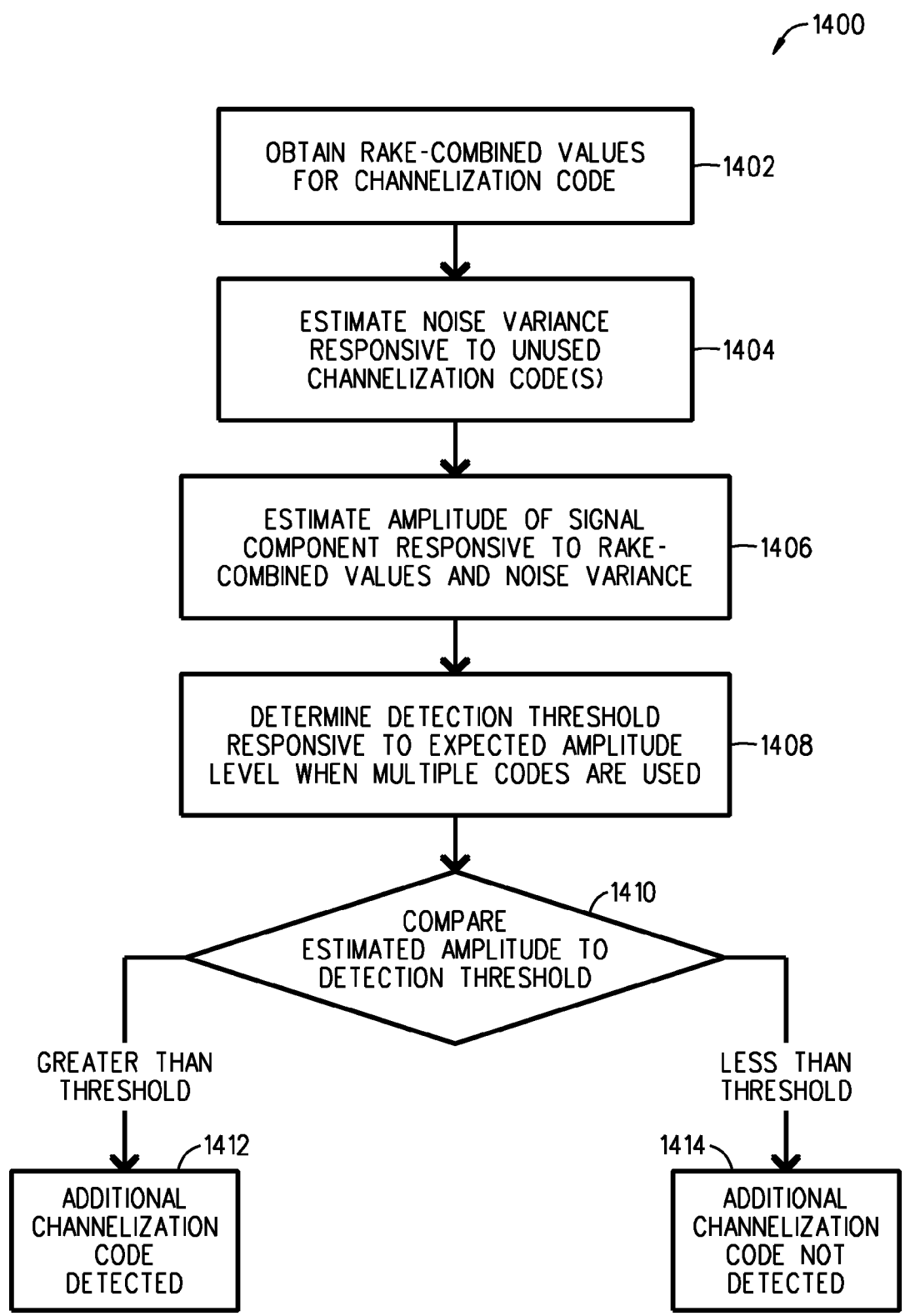
FIG. 14 is a flow diagram of an example method for detecting a number of channelization codes for the TF.

FIG. 14 is a flow diagram 1400 of an example method for detecting a number of channelization codes for the TF. Flow diagram 1400 includes seven steps 1402-1414. For an example embodiment, the acts of flow diagram 1400 may be performed by blind TF detection unit 412 (of FIGS. 4 and 7). Although the principles and steps of flow diagram 1400 may be used in conjunction with other standards, the description below refers to particular aspects of WCDMA by way of example without limitation. For instance, the number of channelization codes corresponds to the number of Enhanced Dedicated Physical Control Channels (E-DPDCHs) in WCDMA. The description below therefore describes detecting the number of E-DPDCHs. It should be understood that embodiments described herein for detecting a number of channelization codes (e.g., of a TF) may also be implemented separately and independently of embodiments for detecting a TF from a reduced set of TF hypotheses.

If the SF is 2 or 4, a multicode transmission may be possible with 10 ms TTI, depending on the configuration and user equipment category. In this case, additional E-DPDCH(s) can be transmitted on the other quadrature branch of the same channelization code used by E-DPDCH1 and on more channelization codes.

In a given example, E-DPDCH1 is determined through an SF detection mechanism to have SF=4. With SF=4, there are two possible configurations (with $\alpha_1$ and $\alpha_2$ being known a priori):

Configuration 1: One E-DPDCH1. In this configuration, E-DPDCH1 uses channelization code $C_{Ch,4,1}$ on the in-phase (I) channel and an amplitude scaling factor $\alpha_1$.

Configuration 2: Two E-DPDCHs. In this configuration, E-DPDCH1 uses $C_{Ch,4,1}$ on the I channel, and E-DPDCH2 uses $C_{Ch,4,1}$ on the quadrature-phase (Q) channel. Both share the same amplitude scaling factor $\alpha_2$.

With reference to flow diagram 1400, at step 1402 Rake-combined values are obtained for any possible channelization codes (e.g., that are pertinent to the current configuration/settings and have not been filtered out). Thus, the process of detecting the number of E-DPDCHs starts with obtaining Rake-combined values corresponding to the different E-DP-DCHs.

The variable $z_{4,1}(k)$ is the complex-valued Rake (or G-Rake) receiver output. It is obtained by despreading the received signal using the channelization code $C_{Ch,4,1}$ and combining the multiple despread values using a combining weight vector w. Then, the Rake-combined values for E-DPDCH1 according to the above example is $y_{EDPDCH1}(k)=\text{Re}\{z_{4,1}(k)\}$, and for E-DPDCH2, $y_{EDPDCH2}(k)=\text{Im}\{z_{4,1}(k)\}$.

It can be shown that $y_{EDPDCHi}(k)$ has the following form of equation (1):

$$y_{EDPDCHi}(k)=A(i)b_i(k)+n_i(k), \quad (1)$$

where A(i) is the amplitude of the signal component, $b_i(k)$ is the BPSK or 4-PAM symbol, and $n_i(k)$ is the noise component, which has variance $\sigma^2$. Here, it is assumed that the average power of $b_i(k)$ is 1.

At step 1404, the noise variance is estimated responsive to unused channelization codes. Thus, a second step for detecting the number of E-DPDCHs involves estimating the noise variance $\sigma^2$. This estimation may be accomplished by averaging Rake-combined values obtained from one or more unused channelization codes. For example, the variable $z_{256,m}(k)$ is the complex-valued Rake (or G-Rake) receiver output. It is obtained by despreading the received signal with an unused channelization code such as $C_{Ch,256,m}$ (assuming this channelization code is not used by any physical channel). The multiple despread values are then combined using a combining weight vector w (e.g., the same weight vector that is used to obtain $z_{4,1}(k)$).

The noise variance can then be estimated by the following equation:

$$\hat{\sigma}^2 = \left(\frac{1}{2}\right)\left(\frac{4}{256}\right)\frac{1}{K|M|}\sum_{m \in M}\sum_{k=0}^{K-1}|z_{256,m}(k)|^2,$$

where the set M contains a number of unused codes that can be used for noise variance estimation, the factor of (½) accounts for the fact that noise in equation (1) is real-valued whereas $z_{256,m}(k)$ is complex-valued, and the factor of (4/256) adjusts for the spreading factor difference between an unused code and the code used by E-DPDCHi. Hence, if the spreading factor of E-DPDCHi is 2, a (2/256) factor is used instead given the example unused channelization code $C_{Ch,256,m}$.

At step 1406, the amplitude of the signal component is estimated responsive to the Rake-combined values and the estimated noise variance. Thus, a third step for detecting the number of E-DPDCHs involves estimating the amplitude of the signal component A(i) from equation (1). This estimation may be achieved, for example, with the following equation:

$$\hat{A}(i) = \sqrt{E[|y_{EDPDCHi}(k)|^2] - \hat{\sigma}^2}.$$

Because E-DPDCH1 is always present in both of the configurations under consideration here, the channelization code detection is focused on whether or not E-DPDCH2 is present. If E-DPDCH2 is present, Configuration 2 is detected; otherwise, Configuration 1 is detected. To detect whether E-DPDCH2 is present, the estimate of the amplitude of the signal component is compared to a detection threshold T.

At step 1408, a detection threshold is determined responsive to an expected amplitude level when multiple codes are used. At step 1410, the estimated amplitude of the signal component is compared to the detection threshold. If the estimated amplitude is greater than the detection threshold, then at step 1412 it is determined that an additional channelization code has been detected. If, on the other hand, the estimated amplitude is less than the detection threshold, then at step 1414 it is determined that an additional channelization code has not been detected.

Thus, if $\hat{A}(2) > T$, E-DPDCH2 is detected to be present. The detection threshold can be determined by the expected amplitude level of $y_{EDPDC2i}(k)$ when Configuration 2 is used. The variable $h_y$ is the net response estimate obtained through DPCCH. The expected amplitude level of $y_{EDPDCi}(k)$ when Configuration 2 is used is $\overline{A} = \alpha w^{11} h_y$, where $\alpha$ accounts for the difference in spreading factor and physical channel amplitude between DPCCH and E-DPDCH2. For example, if the spreading factor of E-DPDCH2 is 4, and the amplitude difference between E-DPDCH2 and DPCCH is $\beta$, $$\alpha = \frac{4\beta}{256}.$$

The detection threshold T can be set, for example, as $T = \overline{A}/\sqrt{2}$.

Figure 15:
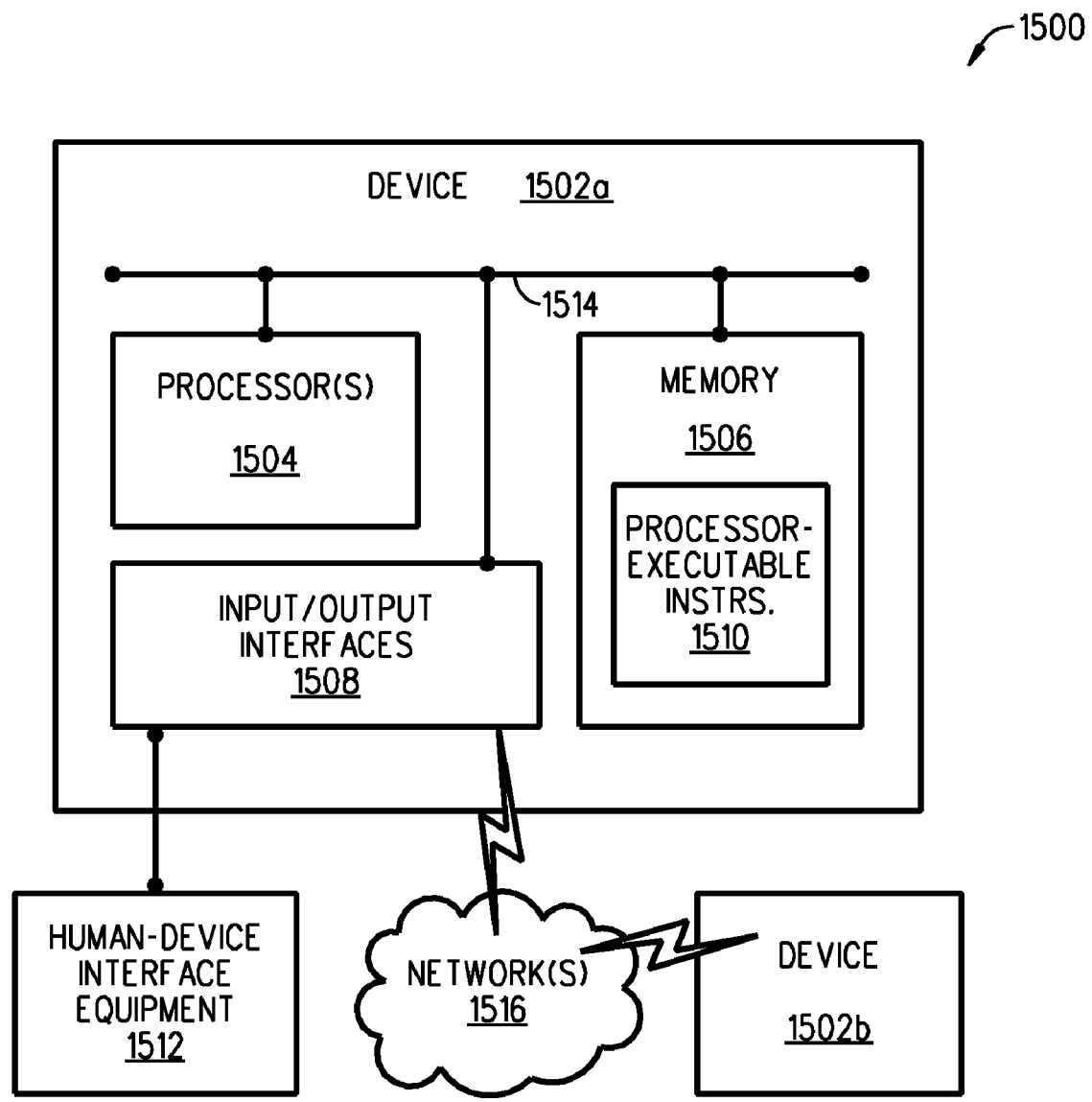
FIG. 15 is a block diagram of example devices that may be used to implement embodiments for blind detection of the TF of a signal.

FIG. 15 is a block diagram 1500 of example devices 1502 that may be used to implement embodiments for blind detection of the TF of a signal. As illustrated, block diagram 1500 includes two devices 1502a and 1502b, human-device interface equipment 1512, and one or more networks 1516. As explicitly shown with device 1502a, each device 1502 may include at least one processor 1504, one or more memories 1506, one or more input/output interfaces 1508, and at least one interconnection 1514. Memory 1506 may include processor-executable instructions 1510. Network(s) 1516 may be, by way of example but not limitation, an internet, an intranet, an Ethernet, a public network, a private network, a cable network, a digital subscriber line (DSL) network, a telephone network, a wired network, a wireless network, some combination thereof, and so forth. Device 1502a and device 1502b may communicate over network(s) 1516.

For example embodiments, device 1502 may represent any processing-capable device. Processor 1504 may be implemented using any applicable processing-capable technology, and one may be realized as a general-purpose or a special-purpose processor. Examples include, but are not limited to, a central processing unit (CPU), a digital signal processor (DSP), a microprocessor, some combination thereof, and so forth. Memory 1506 may be any available memory that is included as part of and/or is accessible by device 1502. It includes volatile and non-volatile memory, removable and non-removable memory, hard-coded logic, combinations thereof, and so forth.

Interconnection 1514 interconnects the components of device 1502. Interconnection 1514 may be realized as a bus or other connection mechanism and may directly or indirectly interconnect various components. I/O interfaces 1508 may include (i) a network interface for monitoring and/or communicating across network 1516, (ii) a display device interface for displaying information on a display screen, (iii) one or more human-device interfaces, and so forth. Example network interfaces include, but are not limited to, a radio or transceiver (e.g., a transmitter and/or receiver), a modem, a network card, some combination thereof, and so forth. Human-device interface equipment 1512 may be integrated with or discrete from device 1502.

Generally, processor 1504 is capable of executing, performing, and/or otherwise effectuating processor-executable instructions, such as processor-executable instructions 1510. Memory 1506 is comprised of one or more processor-accessible memories. In other words, memory 1506 may include processor-executable instructions 1510 that are executable by processor 1504 to effectuate the performance of functions by device 1502. Processor-executable instructions 1510 may be embodied as software, firmware, hardware, fixed logic circuitry, some combination thereof, and so forth. Processor 1504 and processor-executable instructions 1510 of memory 1506 may be realized separately (e.g., as a DSP executing code) or in an integrated form (e.g., as part of an application-specific integrated circuit (ASIC)).

In example implementations, one device 1502 may comprise a transmitting device 102, and another device 1502 may comprise a receiving device 104 (of FIGS. 1 and 4). Processor-executable instructions 1510 may comprise, for example, the components, mechanisms, units, etc. of FIGS. 4, 6, and 7. When processor-executable instructions 1510 are executed by processor 1504, the functions that are described herein may be effectuated. Example functions include, but are not limited to, those that are illustrated by flow diagrams 500, 800, and 1400 (of FIGS. 5, 8, and 14, respectively), as well as those that are embodied by the other features (including the filter examples of FIGS. 9-13) that are described herein.

Different embodiment(s) of the invention can offer one or more advantages. Generally, application of IC can increase system performance in terms of, for example, peak data rate, system throughput, system capacity, and so forth. More specifically, certain embodiments reduce the complexity and/or increase the performance of pre-decoding IC. For example, detection of the TF of an interfering signal that is potentially a signal to be canceled can be facilitated. As another advantage, certain embodiments can be implemented in a receiving device that forms a single node in a wireless environment. For example, embodiments may be realized by a Node B without being dependent on any system level changes or configurations (e.g., on an E-DPCCH power setting).

The devices, features, functions, methods, steps, schemes, mechanisms, data structures, procedures, components, etc. of FIGS. 1-15 are illustrated in diagrams that are divided into multiple blocks and other elements. However, the order, interconnections, interrelationships, layout, etc. in which FIGS. 1-15 are described and/or shown are not intended to be construed as limiting, for any number of the blocks and/or other elements may be modified, combined, rearranged, augmented, omitted, etc. in many manners to implement one or more systems, methods, devices, memory, apparatuses, arrangements, etc. for blind detection of the TF of a signal.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

What is claimed is:

1. A method for blind detection of a transport format of an interferring signal, the method comprising steps of:
   receiving a composite signal comprising one or more interfering signals, including the interfering signal, and at least one desired signal;
   filtering a set of transport format hypotheses to identify a reduced set of transport format hypotheses using one or more filtering schemes;
   from the reduced set of transport format hypotheses, detecting a transport format associated with the interfering signal, the transport format comprising a modulation and a spreading factor for the interfering signal;
   the transport format further comprises a number of channelization codes for the interfering signal; and
   the step of filtering comprises the step of applying the one or more filtering schemes to filter transport format hypotheses based on a system configuration that establishes relationships between spreading factors and number of channelization codes.

2. The method as recited in claim 1, wherein the step of filtering further comprises the step of applying the one or more filtering schemes to filter transport format hypotheses based on a duration for a communication interval of the interfering signal, with the duration establishing a signal modulation for the interfering signal.

3. The method as recited in claim 1, wherein the step of filtering comprises the step of applying the one or more filtering schemes to filter transport format hypotheses based on one or more system operational parameters that exclude at least one spreading factor.

4. The method as recited in claim 1, wherein the step of filtering comprises the step of applying the one or more filtering schemes to filter transport format hypotheses based on one or more system operational parameters that exclude at least one modulation.

5. The method as recited in claim 1, wherein the step of filtering comprises the step of applying the one or more filtering schemes to filter transport format hypotheses based on information that a particular modulation range is determinable from a particular physical layer category of a transmitting device; and wherein the step of applying comprises the step of excluding modulations that are outside the particular modulation range from the reduced set of transport format hypotheses.

6. The method as recited in claim 1, wherein the step of detecting a transport format comprises the steps of computing decision metrics for the transport format hypotheses of the reduced set of transport format hypotheses and blindly detecting the transport format associated with the interfering signal responsive to the computed decision metrics.

7. The method as recited in claim 1, wherein the set of transport format hypotheses comprises a universe of transport format hypotheses that includes a total number of transport format hypotheses that are possible for a given particular operational standard.

8. A method for blind detection of a transport format of an interferring signal, the method comprising steps of:
   receiving a composite signal comprising one or more interfering signals, including the interfering signal, and at least one desired signal;
   filtering a set of transport format hypotheses to identify a reduced set of transport format hypotheses using one or more filtering schemes;
   from the reduced set of transport format hypotheses, detecting a transport format associated with the interfering signal, the transport format comprising a modulation and a spreading factor for the interfering signal;
   the step of filtering comprises the step of applying the one or more filtering schemes to filter transport format hypotheses based on information that a particular modulation is used by a particular transmission time interval, TTI; and
   the step of applying comprises the step of excluding modulations that are not the particular modulation from the reduced set of transport format hypotheses.

9. A method for blind detection of a transport format of an interferring signal, the method comprising steps of:
   receiving a composite signal comprising one or more interfering signals, including the interfering signal, and at least one desired signal;
   filtering a set of transport format hypotheses to identify a reduced set of transport format hypotheses using one or more filtering schemes;
   from the reduced set of transport format hypotheses, detecting a transport format associated with the interfering signal, the transport format comprising a modulation and a spreading factor for the interfering signal;
   the step of filtering comprises the step of applying the one or more filtering schemes to filter transport format hypotheses based on information that a particular spreading factor range is determinable from a particular physical layer category of a transmitting device; and the step of applying comprises the step of excluding spreading factors that are outside the particular spreading factor range from the reduced set of transport format hypotheses.

10. The method as recited in claim 9, wherein the transport format further comprises a number of channelization codes for the interfering signal; and wherein the particular physical layer category of the transmitting device establishes a minimum spreading factor and a maximum number of channelization codes.

11. A method for blind detection of a transport format of an interferring signal, the method comprising steps of:
  receiving a composite signal comprising one or more interfering signals, including the interfering signal, and at least one desired signal;
  filtering a set of transport format hypotheses to identify a reduced set of transport format hypotheses using one or more filtering schemes;
  from the reduced set of transport format hypotheses, detecting a transport format associated with the interfering signal, the transport format comprising a modulation and a spreading factor for the interfering signal;
  the transport format further comprises a number of channelization codes for the interfering signal;
  the step of filtering comprises the step of applying the one or more filtering schemes to filter transport format hypotheses based on information that a signaled maximum transmission rate forces a remote terminal to use a minimum spreading factor and a maximum number of channelization code(s); and
  the step of applying comprises the steps of excluding spreading factors that are less than the minimum spreading factor and excluding numbers of channelization codes that are greater than the maximum number of channelization code(s) from the reduced set of transport format hypotheses.

12. A method for blind detection of a transport format of an interferring signal, the method comprising steps of:
  receiving a composite signal comprising one or more interfering signals, including the interfering signal, and at least one desired signal;
  filtering a set of transport format hypotheses to identify a reduced set of transport format hypotheses using one or more filtering schemes;
  from the reduced set of transport format hypotheses, detecting a transport format associated with the interfering signal, the transport format comprising a modulation and a spreading factor for the interfering signal;
  the step of filtering comprises the step of applying the one or more filtering schemes to reduce a number of potential transport format hypotheses based on an expected level of interference contribution from the interfering signal.

13. The method as recited in claim 12, wherein the step of applying comprises the step of excluding transport format hypotheses with spreading factors that meet a predefined spreading factor threshold from the reduced set of transport format hypotheses.

14. A method for blind detection of a transport format of an interfering signal, the method comprising steps of:
  receiving a composite signal comprising one or more interfering signals, including the interfering signal, and at least one desired signal;
  filtering a set of transport format hypotheses to identify a reduced set of transport format hypotheses using one or more filtering schemes;
  from the reduced set of transport format hypotheses, detecting a transport format associated with the interfering signal, the transport format comprising a modulation and a spreading factor for the interfering signal;
  if the detected transport format meets a predetermined criterion, categorizing the interfering signal as a signal to be canceled and detecting symbols carried by the signal to be canceled using the detected transport format; and
  the predetermined criterion comprises a predefined spreading factor threshold.

15. A method for blind detection of a transport format of an interfering signal, the method comprising steps of:
  receiving a composite signal comprising one or more interfering signals, including the interfering signal, and at least one desired signal;
  filtering a set of transport format hypotheses to identify a reduced set of transport format hypotheses using one or more filtering schemes;
  from the reduced set of transport format hypotheses, detecting a transport format associated with an interfering signal, the transport format comprising a modulation and a spreading factor for the interfering signal;
  detecting transmitted modulation symbols of the interfering signal using the detected transport format;
  regenerating the interfering signal from the transmitted modulation symbols that are detected to be carried by the interfering signal;
  canceling the regenerated signal from the composite signal to implement pre-decoding interference cancellation; and,
  detecting the at least one desired signal from the composite signal after the step of canceling.

16. The method as recited in claim 15, wherein the steps of filtering, detecting a transport format, detecting transmitted modulation symbols, regenerating, and canceling are repeated for each interfering signal of the one or more interfering signals of the composite signal.

17. A method for blind detection of a transport format of an interfering signal, the method comprising steps of:
  receiving a composite signal comprising one or more interfering signals, including the interfering signal, and at least one desired signal;
  filtering a set of transport format hypotheses to identify a reduced set of transport format hypotheses using one or more filtering schemes;
  from the reduced set of transport format hypotheses, detecting a transport format associated with the interfering signal, the transport format comprising a modulation and a spreading factor for the interfering signal; and
  wherein the transport format further comprises a number of channelization codes for the interfering signal; and wherein the step of detecting a transport format comprises the step of determining the number of channelization codes for the interfering signal based on a detection threshold.

18. The method as recited in claim 17, wherein the step of determining the number of channelization codes comprises the steps of:
  obtaining a Rake-combined value for at least one channelization code;
  estimating a noise variance responsive to an unused channelization code;
  estimating an amplitude of a signal component responsive to the obtained Rake-combined value and the estimated noise variance;

comparing the estimated amplitude of the signal component to the detection threshold;

if the estimated amplitude is greater than the detection threshold, determining that an additional channelization code has been detected; and, if the estimated amplitude is less than the detection threshold, determining that an additional channelization code has not been detected.

19. The method as recited in claim 18, wherein the step of obtaining comprises the step of obtaining the Rake-combined value using a combining weight that is determined responsive to an impairment covariance.

20. The method as recited in claim 17, wherein the step of determining the number of channelization codes comprises the step of determining the detection threshold responsive to an expected amplitude level when multiple codes are used.

21. A receiving device adapted to perform blind detection of a transport format of an interfering signal, the receiving device comprising:

one or more processors to:

receive a composite signal comprising one or more interfering signals, including the interfering signal, and at least one desired signal, filter a set of transport format hypotheses to identify a reduced set of transport format hypotheses using one or more filtering schemes;

from the reduced set of transport format hypotheses, detect a transport format associated with the interfering signal, the transport format comprising a modulation and a spreading factor for the interfering signal;

the transport format further comprises a number of channelization codes for the interfering signal; and the filter operation further comprises applying the one or more filtering schemes to filter transport format hypotheses based on a system configuration that establishes relationships between spreading factors and number of channelization codes.

22. A system adapted to perform blind detection of a transport format of an interferring signal, the system comprising:

a remote terminal; and a network communication node including one or more processors to:

receive a composite signal comprising one or more interfering signals, including the interfering signal, and at least one desired signal;

filter a set of transport format hypotheses to identify a reduced set of transport format hypotheses using one or more filtering schemes;

from the reduced set of transport format hypotheses, detect a transport format associated with the interfering signal, the transport format comprising a modulation and a spreading factor for the interfering signal;

the transport format further comprises a number of channelization codes for the interfering signal; and the filter operation further comprises applying the one or more filtering schemes to filter transport format hypotheses based on a system configuration that establishes relationships between spreading factors and number of channelization codes.

* * * * *

UNITED STATES PATENT AND TRADEMARK OFFICE
CERTIFICATE OF CORRECTION

PATENT NO. : 8,315,344 B2
APPLICATION NO. : 12/421059
DATED : November 20, 2012
INVENTOR(S) : Ringstrom et al.

It is certified that error appears in the above-identified patent and that said Letters Patent is hereby corrected as shown below:

On the Title Page:

In Item (56), under "OTHER PUBLICATIONS", in Column 2, Line 14, delete "Joint-Decection" and insert -- Joint-Detection --, therefor.

In the Specifications:

In Column 4, Line 39, delete "example" and insert -- example of --, therefor.

In Column 5, Line 45, delete "diem." and insert -- them. --, therefor.

In Column 15, Line 52, delete "vol" and insert -- vol. --, therefor.

In Column 15, Line 56, delete "$y_2(k)$" and insert -- $y_2(k).$ --, therefor.

In Column 16, Line 38, delete "$C_{Ch,4,1}$" and insert -- $C_{Ch,4,1}$ --, therefor.

In Column 16, Line 41, delete "$C_{Ch,4,1}$ on the I channel," and insert -- $C_{Ch,4,1}$ on the I channel, --, therefor.

In Column 16, Line 42, delete "$C_{Ch,4,1}$" and insert -- $C_{Ch,4,1}$ --, therefor.

In Column 16, Line 51, delete "$z_{4,1}(k)$" and insert -- $z_{4,1}(k)$ --, therefor.

In Column 16, Line 53, delete "$C_{Ch,4,1}$" and insert -- $C_{Ch,4,1}$ --, therefor.

In Column 16, Line 57, delete "$=Re\{z_{4,1}(k)\},$" and insert -- $=Re\{z_{4,1}(k)\},$ --, therefor.

In Column 16, Line 57, delete "$=Im\{z_{4,1}$" and insert -- $=Im\{z_{4,1}$ --, therefor.

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,315,344 B2

In Column 16, Line 61, in Equation (1), delete "$y_{EDPDCH1}(k)=$" and insert -- $y_{EDPDCHi}(k)=$ --, therefor.

In Column 16, Line 62, delete "$b_1(k)$" and insert -- $b_i(k)$ --, therefor.

In Column 17, Line 11, delete "$z_{4,1}(k))$." and insert -- $z_{4,1}(k))$. --, therefor.

In Column 17, Line 61, delete "$h_y$" and insert -- $h_p$ --, therefor.

In Column 17, Line 63, delete "$\bar{A}=\alpha w^{11} h_y$," and insert -- $\bar{A}=\alpha w^H h_p$, --, therefor.

In Column 18, Line 3, delete "a" and insert -- $\alpha$ --, therefor.

In the Claims:

In Column 23, Line 24, in Claim 21, delete "signal," and insert -- signal; --, therefor.